US009635595B2

(12) United States Patent
Chen et al.

(10) Patent No.: US 9,635,595 B2
(45) Date of Patent: Apr. 25, 2017

(54) RADIO BASE STATION, METHOD IN A RADIO BASE STATION, RELAY STATION AND METHOD IN A RELAY STATION

(75) Inventors: Tsao-Tsen Chen, Täby (SE); Lars Klockar, Stockholm (SE); Chrysostomos Koutsimanis, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 497 days.

(21) Appl. No.: 14/233,807

(22) PCT Filed: Jul. 25, 2011

(86) PCT No.: PCT/SE2011/050966
§ 371 (c)(1),
(2), (4) Date: Apr. 11, 2014

(87) PCT Pub. No.: WO2013/015727
PCT Pub. Date: Jan. 31, 2013

(65) Prior Publication Data
US 2014/0349647 A1 Nov. 27, 2014

(51) Int. Cl.
*H04W 84/04* (2009.01)
*H04W 36/04* (2009.01)
(Continued)

(52) U.S. Cl.
CPC ....... *H04W 36/30* (2013.01); *H04W 36/0083* (2013.01); *H04W 36/04* (2013.01); *H04W 36/22* (2013.01); *H04W 84/047* (2013.01)

(58) Field of Classification Search
CPC . H04W 36/30; H04W 36/0083; H04W 36/04; H04W 36/22; H04W 84/047
(Continued)

(56) References Cited

U.S. PATENT DOCUMENTS 8,412,245 B2   4/2013 Delaval
2006/0140117 A1*  6/2006 Aerrabotu ............. H04W 36/26
                                                370/232
(Continued)

FOREIGN PATENT DOCUMENTS

GB    2475851 A    6/2011
WO    2009097070 A1  8/2009
WO    2010130268 A1  11/2010

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)." 3GPP TS 36.300 V10.2.0, Section 10.1.2.1.1. 63-66.
(Continued)

*Primary Examiner* — Marisol Figueroa
(74) *Attorney, Agent, or Firm* — Murphy, Bilak & Homiller, PLLC

(57) ABSTRACT

Methods and network nodes (110, 112), serving a user equipment (120), for deciding if a handover request of the user equipment (120) is to be sent to a candidate target network node (130-1, 130-2, 130-3). The methods comprise acquire (603) data-rate performance of a wireless link between the network nodes (110, 112) and the user equipment (120). The data-rate performance is compared (606) with a data-rate performance threshold value. If the acquired data-rate performance is lower than the data-rate performance threshold value, it is decided (607) to send the handover request of the user equipment (120) to the candidate target network node (130-1, 130-2, 130-3).

44 Claims, 19 Drawing Sheets

(51) Int. Cl.
*H04W 36/22* (2009.01)
*H04W 36/30* (2009.01)
*H04W 36/00* (2009.01)

(58) Field of Classification Search
USPC .................................................. 455/436–444
See application file for complete search history.

(56) References Cited

U.S. PATENT DOCUMENTS

2007/0249347 A1* 10/2007 Saifullah ............... H04W 36/38
455/436
2009/0197603 A1* 8/2009 Ji ...................... H04W 36/0083
455/436

OTHER PUBLICATIONS

Dimou, et al., "Handover within 3GPP LTE: Design Principles and Performance." IEEE 2009. 1-5.

* cited by examiner

ThV = Data-Rate Performance Threshold Value = $\beta \cdot Rmax$

Rs = Throughput of current link (source node = RBS)

Rt = Throughput of target link (target node = RS)

Re2emax = $\min(\alpha, 1-\alpha) \cdot Rmax$

ThV = Data-Rate Performance Threshold Value = $\gamma \cdot$ Re2emax

Rs = Throughput of current link (source node = RS)

Rt = Throughput of target link (target node = RBS)

Re2emax = $\min(\alpha, 1-\alpha) \cdot$ Rmax

Low load:
$\beta \rightarrow \min(\alpha, 1-\alpha)$

High load:
$\beta \rightarrow 0$

ThV = Data-Rate Performance Threshold Value = $\beta \cdot R_{max}$

Rs = Throughput of current link (source node = RS)

Rt = Throughput of target link (target node = RS)

Re2emax = $\min(\alpha, 1-\alpha) \cdot R_{max}$

RADIO BASE STATION, METHOD IN A RADIO BASE STATION, RELAY STATION AND METHOD IN A RELAY STATION

TECHNICAL FIELD

Implementations described herein relate generally to a radio base station, a method in a radio base station, a relay station and a method in a relay station. In particular is herein described how to determine if handover request of a user equipment, served by either the radio base station or the relay station, is to be sent to a candidate target network node.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/radio base station at a base station site. One radio base station, situated on the base station site, may serve at least one cell. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

In 3rd Generation Partnership Project (3GPP) Long Term Evolution (LTE), network nodes, or radio base stations, which may be referred to as eNodeBs or even eNBs, may be connected to a gateway e.g. a radio access gateway, to one or more core networks.

UMTS is a third generation mobile communication system, which evolved from the GSM, and is intended to provide improved mobile communication services based on Wideband Code Division Multiple Access (WCDMA) technology. UMTS Terrestrial Radio Access Network (UTRAN) is essentially a radio access network using wideband code division multiple access for user equipment units. The 3GPP has undertaken to evolve further the UTRAN and GSM based radio access network technologies.

The 3GPP is responsible for the standardization of GSM, UMTS, LTE and LTE-Advanced. LTE is a technology for realizing high-speed packet-based communication that may reach high data rates both in the downlink and in the uplink, and is thought of as a next generation mobile communication system relative UMTS.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

A basic principle used in several different cellular wireless communication systems (GSM, UMTS, LTE) comprises the following steps:
  (a) each network node sends a pilot signal,
  (b) the user equipment measures the received pilot signal strength from the serving network node and from several neighbouring network nodes,
  (c) the user equipment reports back to the serving network node the result of the measurements, and
  (d) the serving network node decides whether the user equipment should be handed over to another cell or not.

Typically, the user equipment is instructed to connect to the network node with the highest received pilot power, which defines the reference cell size. In LTE, the procedure is referred to a Reference Signal Received Power (RSRP) based cell selection.

However one potential solution for achieving higher data rates and network capacity with LTE-Advanced is the deployment of Heterogeneous Networks (HetNet). In HetNet deployments the original Macro-cell layout is complemented with Low Power Nodes (LPN), such as micro nodes, pico nodes, or relay stations (RS). Relay stations are considered as an LTE-Advanced tool for mainly improving/extending the Macro base station coverage and providing higher cell-edge throughput.

The relay station is connected to the donor cell, herein referred to as Radio Base Station (RBS), which may comprise e.g. a macro base station, a micro base station or a pico base station, via a wireless backhaul link. The wireless backhaul link may operate either in the same frequency (inband) or in a different one (outband) with respect to the frequency used in the links between the relay station and the user equipment and between the radio base station and the user equipment, respectively. Thus, in a relay deployment there are three different types of links, namely the links between the radio base station and the user equipment, which may be referred to as direct links. Other kinds of links comprise the links between the relay station and the user equipment, also referred to as access links. Further, there may also be links between the radio base station and the relay station, called backhaul links. For inband relay stations, sharing of the available resources between the access links and the backhaul links imposes limitations on the improvement of the experienced user throughput.

Deployment of relay stations may be based on a radio base station coverage criterion. Relay stations may be placed in areas which are either out of radio base station coverage or exhibit low user equipment bit rates. Relay stations may be equipped with omni-type of antennas thus providing coverage to both indoor and outdoor areas that surround them. In addition to the relay antennas beam shape, the active links between user equipments and nodes (radio base station or relay station) are formed based on the existing (baseline) handover strategy which is inherited from the pure radio base station deployments. Specifically, each user equipment measures the downlink received signal strength, Reference Signal Received Power (RSRP), from a number of network nodes (radio base stations or relay stations) which are in the neighbourhood of the user equipment. Then the user equipment connects to the network node (radio base stations or relay stations) that provides the highest RSRP value.

The RSRP-based cell selection may be acceptable also on the uplink, under some circumstances. However, if there is a difference between the pilot power sent by two network nodes, then the RSRP from the high-power network node may be stronger than the RSRP from the low-power network node, although the user equipment is closer to the low-power network node from a radio and geographic point of view, as the case may be in heterogeneous networks. The coverage of the low-power network node may be significantly smaller than the coverage of the high power network node.

There is a need for improvements in conjunction with handover decisions based on RSRP measurements as a radio base station cell, which may comprise a macro base station, a micro base station, or a pico base station, is complemented with relay stations.

SUMMARY

It is therefore an object to obviate at least some of the above mentioned disadvantages and to improve the performance in a wireless communication system.

According to a first aspect, the object is achieved by a method in a radio base station which is serving a user equipment. The method aims at deciding if a handover request of the user equipment is to be sent to a candidate target network node. The method comprises acquiring data-rate performance of a wireless link between the radio base station and the user equipment. Also, the method comprises comparing the acquired data-rate performance with a data-rate performance threshold value, wherein the data-rate performance threshold value is based on previously determined throughput of a wireless link between at least one user equipment, via a relay node and the radio base station or a neighbouring radio base station. Further, the method comprises deciding to send the handover request of the user equipment to the candidate target network node, if the acquired data-rate performance is lower than the data-rate performance threshold value.

According to a second aspect, the object is achieved by a radio base station, serving a user equipment. The radio base station is configured for deciding if a handover request of the user equipment is to be sent to a candidate target network node. The radio base station comprises a processing circuit, configured to acquire data-rate performance of a wireless link between the radio base station and the user equipment. The processing circuit is further configured to compare the acquired data-rate performance with a data-rate performance threshold value. The data-rate performance threshold value is based on previously determined throughput of a wireless link between at least one user equipment, via a relay node and the radio base station or a neighbouring radio base station. The processing circuit is also configured to decide to send the handover request of the user equipment to the candidate target network node, if the acquired data-rate performance is lower than the data-rate performance threshold value.

According to a third aspect, the object is achieved by a method in a relay station, serving a user equipment. The method aims at deciding if a handover request of the user equipment is to be sent to a candidate target network node. The method comprises acquiring data-rate performance of a wireless link between the relay station and the user equipment. Also, the method comprises comparing the acquired data-rate performance with a data-rate performance threshold value. The data-rate performance threshold value is based on previously determined throughput of a wireless link between at least one user equipment, via a relay node and the radio base station or a neighbouring radio base station. Also, the method comprises deciding to send the handover request of the user equipment to the candidate target network node, if the acquired data-rate performance is lower than the data-rate performance threshold value.

According to a fourth aspect, the object is achieved by a relay station, serving a user equipment. The relay station is configured for deciding if a handover request of the user equipment is to be sent to a candidate target network node. The relay station comprises a processing circuit, configured to acquire data-rate performance of a wireless link between the relay station and the user equipment. The processing circuit is further configured to compare the acquired data-rate performance with a data-rate performance threshold value. The data-rate performance threshold value is based on previously determined throughput of a wireless link between at least one user equipment, via a relay node and the radio base station or a neighbouring radio base station. Further, the processing circuit is also configured to decide to send the handover request of the user equipment to the candidate target network node, if the acquired data-rate performance is lower than the data-rate performance threshold value.

Thanks to embodiments of the methods, radio base station and relay stations, by letting the decision to handover the user equipment from the serving network node, i.e. radio base station, or relay station, to be based on the data-rate performance of a wireless link between the serving network node and the user equipment, rather than signal strength measurements made by the user equipment, less user equipment may be handed over to a relay station if the backhaul link of either the source network node or the target network node is suffering from high interference. Thereby, more user equipment may take advantage of being served by a radio base station, thus achieving a better throughput of data than would have been the case if handed over to the relay station. In addition, in case the serving network node is a relay station and the normal measurement reports on received signal strength does not reveal any candidate target network node comprising a radio base station, an extra handover may be triggered. Thereby, according to embodiments of the method, the user equipment may be triggered to measure and report also weaker received signals than according to prior art methods, e.g. by addition of a delta value to the signal sent from the serving network node. Thus, embodiments of the method may enable a handover to a more remote radio base station, which may provide a higher throughput than a relay station even if the received signal strength is somewhat low.

Further, embodiments disclosed herein may remove unnecessary connections to relay stations in a heterogeneous network. Thereby, network complexity, such as e.g. additional backhaul link processing and signalling overheads, and also e2e time delay may be reduced. Thus an improved performance within the wireless communication system is achieved.

Other objects, advantages and novel features will become apparent from the following detailed description of the herein described methods, radio base stations and relay stations.

BRIEF DESCRIPTION OF THE DRAWINGS

The methods, radio base stations and relay stations are described in more detail with reference to attached drawings illustrating examples of embodiments in which.

DETAILED DESCRIPTION

Embodiments herein are defined as a radio base station, a method in a radio base station, a relay station and a method in a relay station which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1A:
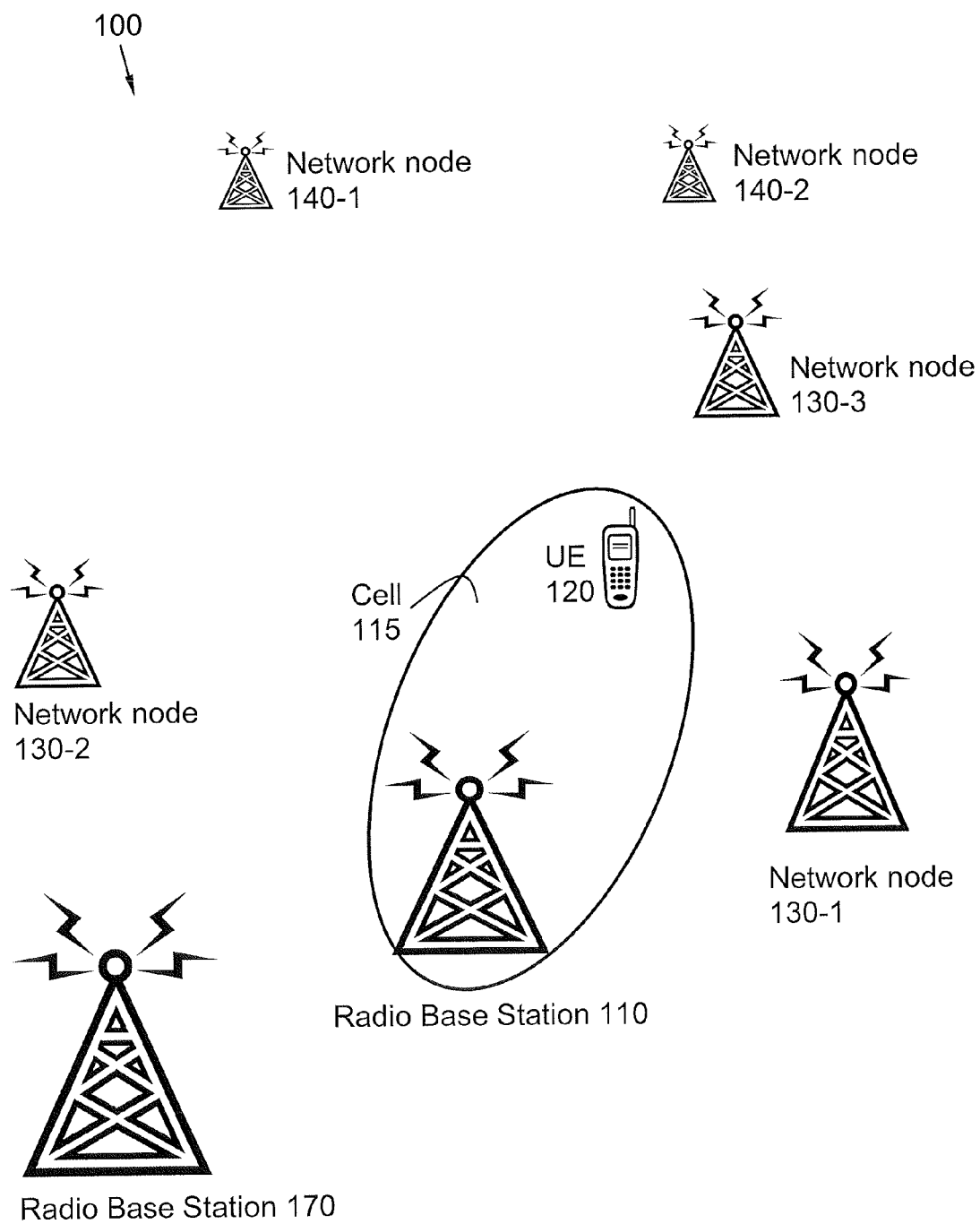
FIG. 1A is a block diagram illustrating a wireless communication system according to some embodiments.

FIG. 1A depicts a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few options. The wireless communication system 100 may comprise a heterogeneous network.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 1A is to provide a general overview of the methods and network nodes herein described, and the functionalities involved. The methods and network nodes will subsequently, as a non-limiting example, be described in a 3GPP/LTE environment, but the embodiments of the disclosed methods and network nodes may operate in a wireless communication system 100 based on another access technology.

The wireless communication system 100 comprises one radio base station 110, which is serving a cell 115, wherein a user equipment 120 may be situated.

The radio base station 110 may according to some embodiments be referred to as e.g. base station, NodeB, evolved Node B (eNB, or eNode B), base transceiver station, Access Point Base Station, base station router, macro base station, micro base station, pico base station, femto base station, Home eNodeB, sensor, beacon device, or any other network node configured for communication with the user equipment 120 over a wireless interface, depending e.g. of the radio access technology and terminology used.

The user equipment 120 is configured to transmit radio signals comprising information to be received by the serving radio base station 110. The user equipment 120 is also configured to receive radio signals comprising information transmitted by the serving radio base station 110. The communication between the serving radio base station 110 and the user equipment 120 is thus made over a link.

The user equipment 120 may be represented by e.g. a wireless communication terminal, a mobile cellular phone, a Personal Digital Assistant (PDA), a wireless platform, a mobile station, a portable communication device, a laptop, a computer, a wireless terminal acting as a mobile relay, a Customer Premises Equipment (CPE), a Fixed Wireless Access (FWA) node or any other kind of device configured to communicate wirelessly via the serving radio base station 110.

The serving radio base station 110 controls the radio resource management within the cell 115, such as e.g. allocating radio resources to user equipment units 120 within the cell 115 and ensuring reliable wireless communication link between the radio base station 110 and the user equipment 120. The radio base station 110 may comprise an eNodeB, e.g. in an LTE-related wireless communication system 100.

Also depicted in FIG. 1A are a number of candidate target network nodes 130-1, 130-2, 130-3 and also some more distant candidate target network nodes 140-1, 140-2. In addition also another radio base station 170 is depicted in FIG. 1A.

The candidate target network nodes 130-1, 130-2, 130-3, 140-1, 140-2 may according to some embodiments be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device, a relay station and/or a repeater or any other network node configured for radio communication over a wireless interface, depending e.g. of the radio access technology and terminology used.

Embodiments of the method disclosed herein comprise a handover algorithm for reducing the negative effects of relay deployment and provide improvements concerning handover decisions. The handover strategy is changed, compared with prior art solutions, in order to take into account the backhaul link limitation as well in a heterogeneous network environment. To be more precise, connecting the user equipment 120 to relay station by only evaluating the conventional RSRP signal, as is made in prior art solutions, may lead to situations where user equipment unit 120 with good current average bitrate between the user equipment 120 and the currently serving radio base station 110 is connected to a relay station resulting in lower performance.

According to embodiments of the method disclosed herein, another criterion for handover is taken into account besides, or instead of, prior art RSRP signal measurement reports. Thus, the average e2e throughput, or equivalent channel quality information and, according to some embodiments, cell load such as e.g. cell fractional load may be taken into account in an algorithm for determining if a handover request is to be sent according to some embodiments.

According to embodiments, the relay stations referred to within the wireless communication system 100 may comprise in-band relay stations, which are sharing the available resources between the access links and the backhaul links, thereby imposes limitations on the improvement of the experienced user throughput.

A typical limitation of in-band relay stations is that they are not able to send and receive on the same channel, at the same time, i.e., they use a half-duplex communication mode.

Simulation results have shown that in-band relay stations improve the cell edge throughput but at the expense of reducing mean throughput for the user equipment. The sharing of resources between the backhaul link and the access link imposes a restriction on the maximum experienced throughput of a user equipment connected to a relay station. To be more precise, if the resource utilization split between the backhaul link ($\alpha$) and the access link ($1-\alpha$) is equal ($\alpha=50\%$ of resources to backhaul link and rest $1-\alpha=50\%$ of the resources to access link), then the maximum end-to-end (e2e) throughput of the user equipment 120 connected to the relay station is equal to, for the downlink:

$$R_{e2e,DL,max} = \min(\alpha \cdot R_{backhaul,DL,max}, (1-\alpha) \cdot R_{access,DL,max})$$
$$= 0.5 \cdot \min(R_{backhaul,DL,max}, R_{access,DL,max}),$$

and for the uplink:

$$R_{e2e,UL,max} = \min(\alpha \cdot R_{backhaul,UL,max}, (1-\alpha) \cdot R_{access,UL,max})$$
$$= 0.5 \cdot \min(R_{backhaul,UL,max}, R_{access,UL,max})$$

If:

$$R_{backhaul,DL,max} = R_{access,DL,max} = R_{DL,max}$$

$$R_{backhaul,UL,max} = R_{access,UL,max} = R_{UL,max}$$

where $R_{DL,max}$ and $R_{UL,max}$ are the theoretical maximum downlink and uplink bit rate respectively, with the highest available modulation and coding scheme that the user equipment 120 may achieve, respectively, then the maximum e2e throughput of the user equipment 120 behind the relay station becomes:

$$R_{e2e,DL,max} = 0.5 \cdot R_{DL,max}$$

$$R_{e2e,UL,max} = 0.5 \cdot R_{UL,max}$$

From the above equations, it is evident that user equipment units 120 which currently are connected to a radio base station 110 and have a current bit rate higher than $R_{e2e,DL,max}$ (or $R_{e2e,UL,max}$) may not improve their experienced throughput, in the downlink, and/or uplink by getting connected to a relay station. The case may also be that a user equipment 120 connected to a relay station and having a bit rate equal (or very close) to $R_{e2e,DL,max}$ (or $R_{e2e,UL,max}$) may be improved by doing a handover to a radio base station. In this last case, an estimation of the bitrate in the target radio base station may be made in order to not worsen the performance for the user equipment 120.

A possible solution in a heterogeneous network 100 for making a handover decision may be to obtain the throughput of the target link, i.e. the wireless link between the user equipment 120, via the target relay station to the donor radio base station. However, disadvantages therewith comprise increased signalling between the serving network node and the target network node in order to obtain the throughput of the target link. Thereby is interference within the system 100 increased, and signalling resources becomes occupied with overhead signalling. Alternatively, an estimation of the throughput of the target link may be made at the serving node. However such estimation may be imprecise, require processing and signalling resources, and time consuming, which may delay any handover decision.

Instead, according to embodiments of the methods herein, data-rate performance threshold values are determined at the serving network node and the handover decision comprises measuring the data-rate performance of a wireless link between the serving network node and the user equipment 120, comparing it with the data-rate performance threshold values and deciding to send the handover request of the user equipment 120 to a candidate target network node 130-1, 130-2, 130-3, if the data-rate performance is lower than the data-rate performance threshold value.

Figure 2A:
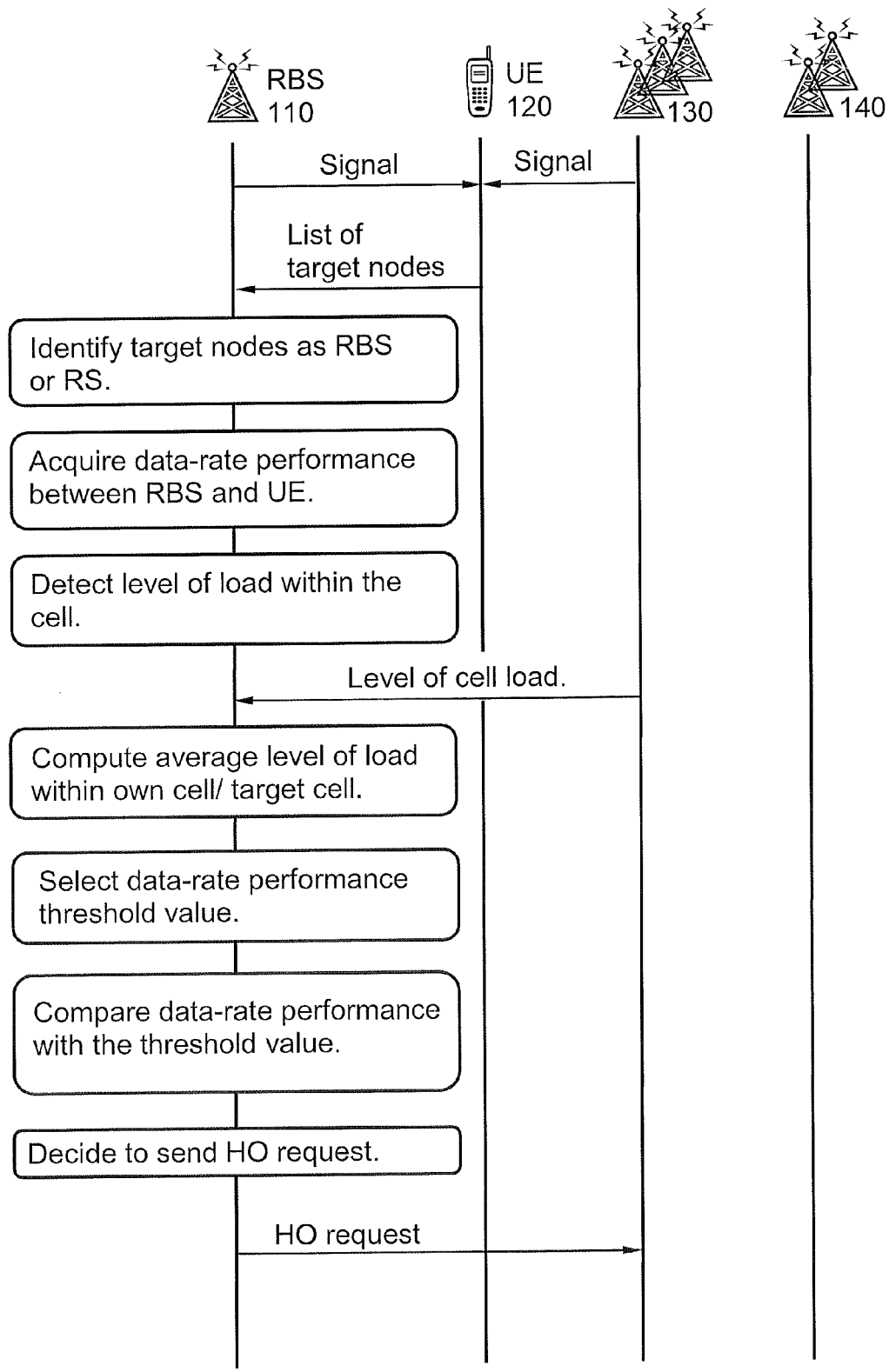
FIG. 2A is a combined block diagram and flow chart illustrating an example of a method in a radio base station according to some embodiments.
Figure 2B:
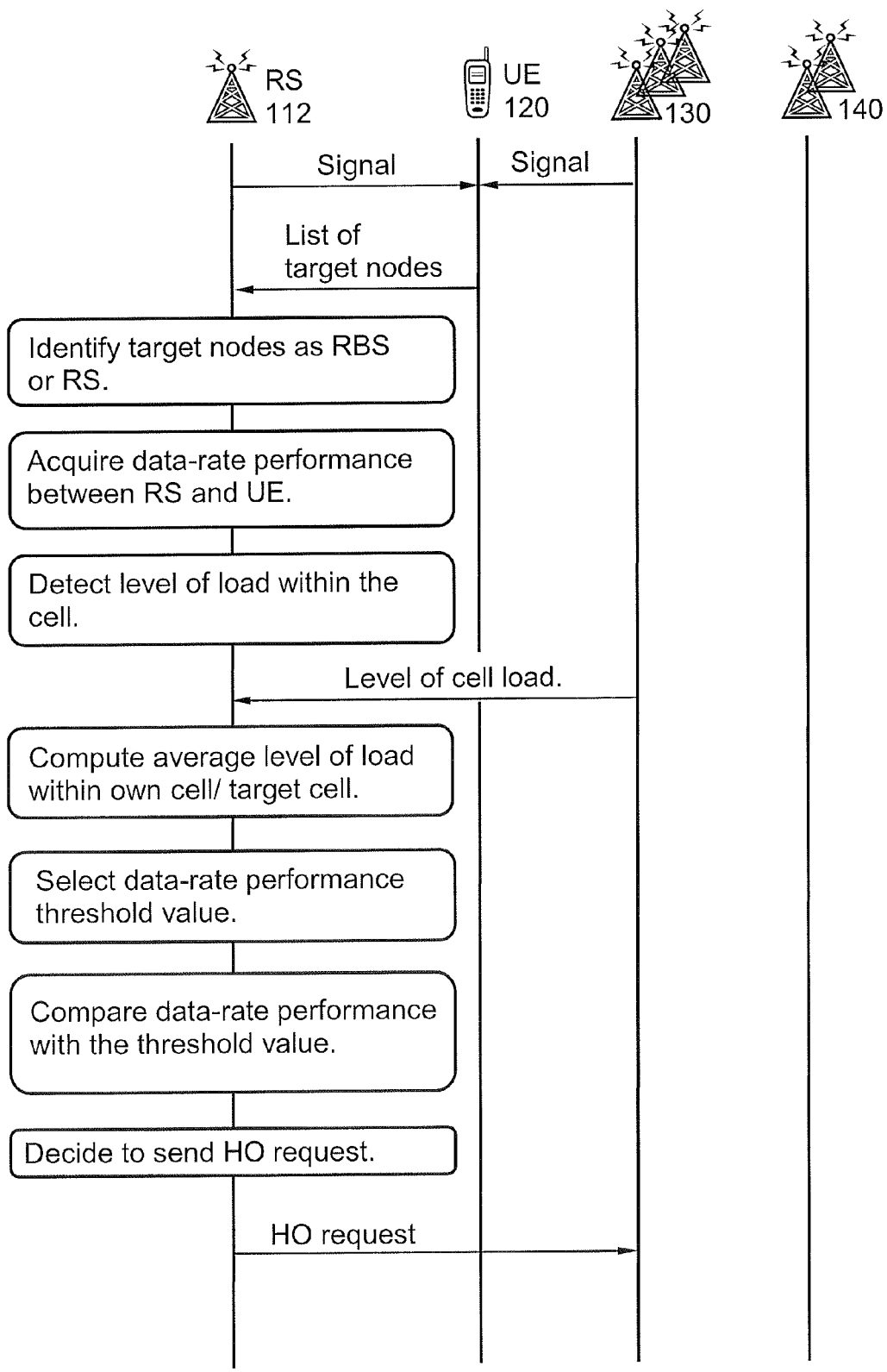
FIG. 2B is a combined block diagram and flow chart illustrating an example of a method in a relay station according to some embodiments.
Figure 2C:
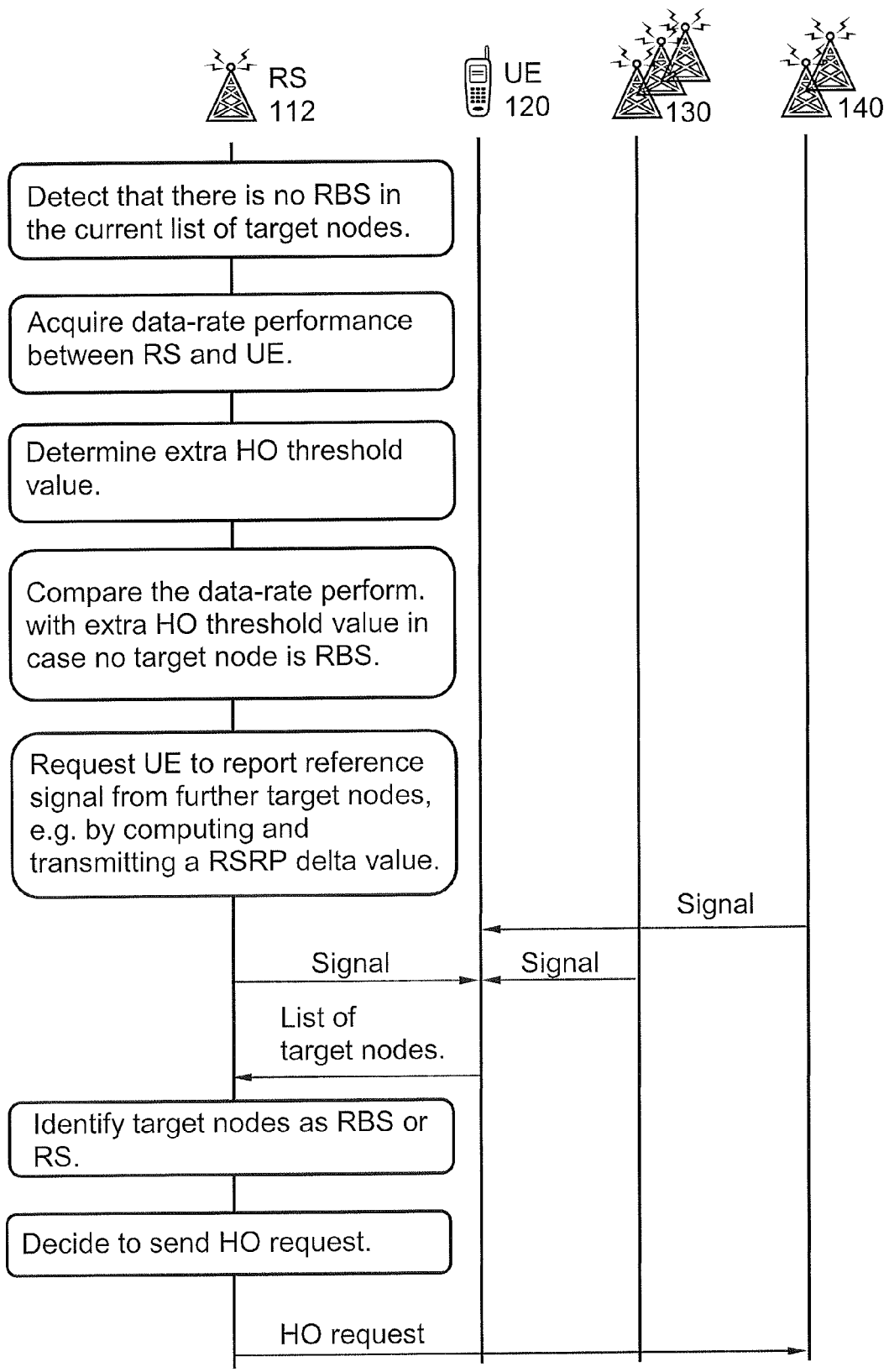
FIG. 2C is a combined block diagram and flow chart illustrating an example of a method in a relay station according to some embodiments.

An overview of an example of a scenario illustrating an embodiment of the method in a radio base station is presented in FIG. 2A, while an overview of an example of a method embodiment in a relay station is presented in FIG. 2B, and an alternative embodiment in a relay station is presented in FIG. 2C.

Figure 2D:
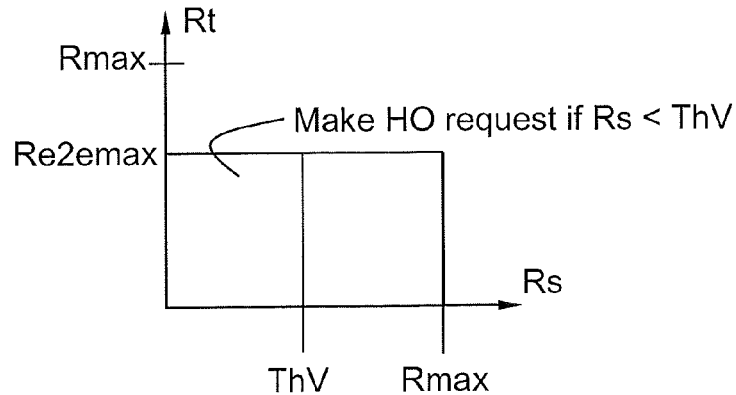
FIG. 2D is an illustration depicting an example of a data rate performance threshold value in a low load environment where the serving node is a radio base station and the target node is a relay station.
Figure 2E:
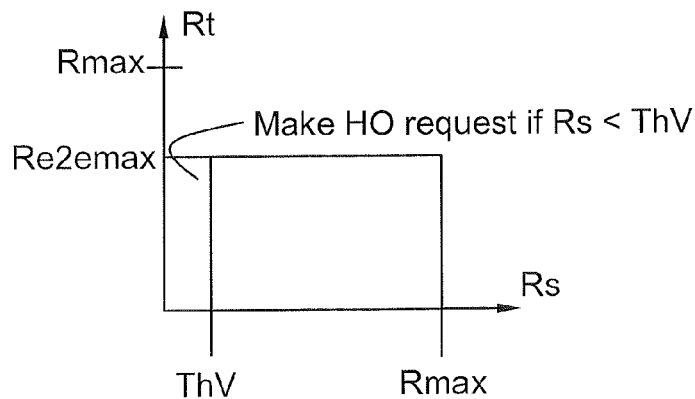
FIG. 2E is an illustration depicting an example of a data rate performance threshold value in a high load environment where the serving node is a radio base station and the target node is a relay station.

Further, some different scenarios wherein the data-rate performance threshold value is determined for some exemplary embodiments and comparisons are made between the data-rate performance and the data-rate performance threshold value is illustrated in FIG. 2D and FIG. 2E, where the serving network node is a radio base station and the target network node is a relay station.

Figure 2F:
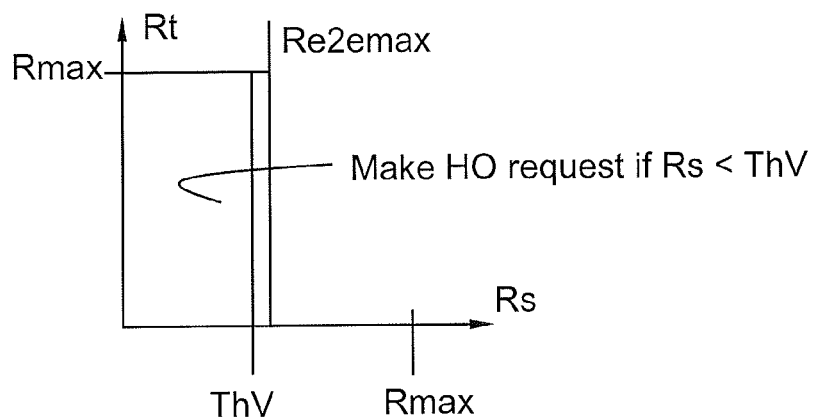
FIG. 2F is an illustration depicting an example of a data rate performance threshold value in a scenario where the serving node is a relay station and the target node is a radio base station.
Figure 2G:
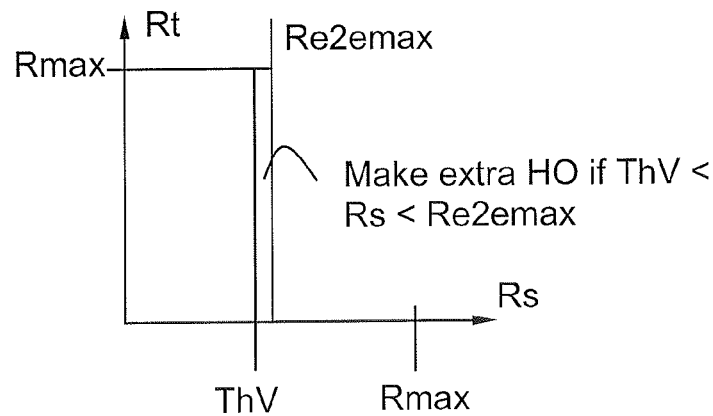
FIG. 2G is an illustration depicting an example of a data rate performance threshold value in a scenario where the serving node is a relay station and the target node is a radio base station, for making extra handover.

In addition, some different scenarios wherein the data-rate performance threshold value is determined for some exemplary embodiments and comparisons are made between the data-rate performance and the data-rate performance threshold value is illustrated in FIG. 2F and FIG. 2G, where the serving network node is a relay station and the target network node is a radio base station.

Figure 2H:
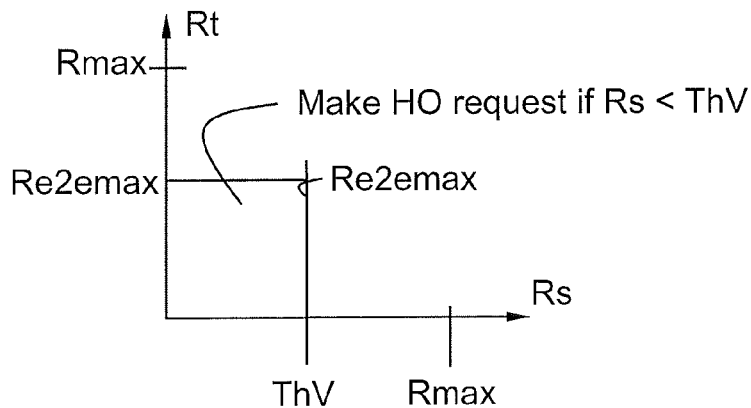
FIG. 2H is an illustration depicting an example of a data rate performance threshold value in a low load environment where the serving node is a relay station and the target node is a relay station.
Figure 2I:
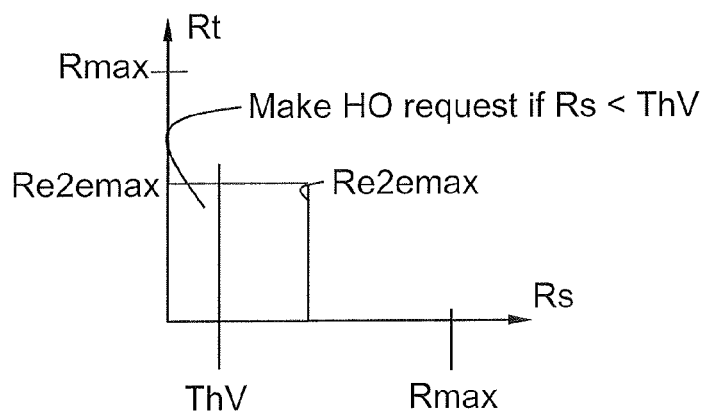
FIG. 2I is an illustration depicting an example of a data rate performance threshold value in a high load environment where the serving node is a relay station and the target node is a relay station.

Also, furthermore some different scenarios wherein the data-rate performance threshold value is determined for some exemplary embodiments and comparisons are made between the data-rate performance and the data-rate performance threshold value is illustrated in FIG. 2H and FIG. 2I, where the serving network node is a relay station and the target network node is a relay station.

In that case, user equipment units 120 that will not benefit from relay stations, e.g. their current e2e throughput is higher than the maximum e2e throughput a relay station theoretically may provide, or over the high cell fractional load area are prevented from being connected to them and the negative effect of relay deployment may be reduced. This scenario is further disclosed in FIG. 3 and will also be further discussed in conjunction with the presentation thereof.

Figure 4A:
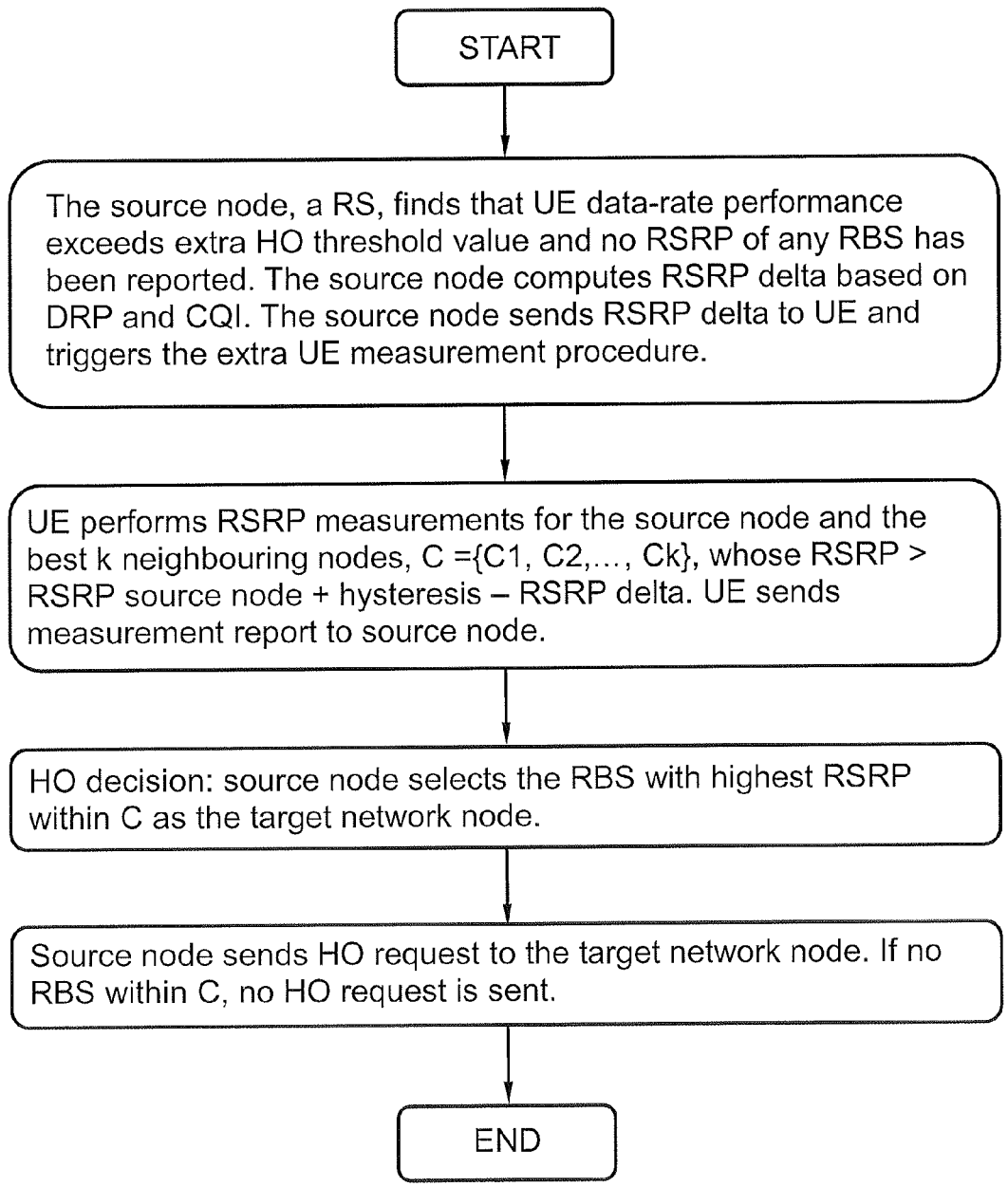
FIG. 4A is a flow chart illustrating an embodiment of a feature of the method in a relay station.
Figure 4B:
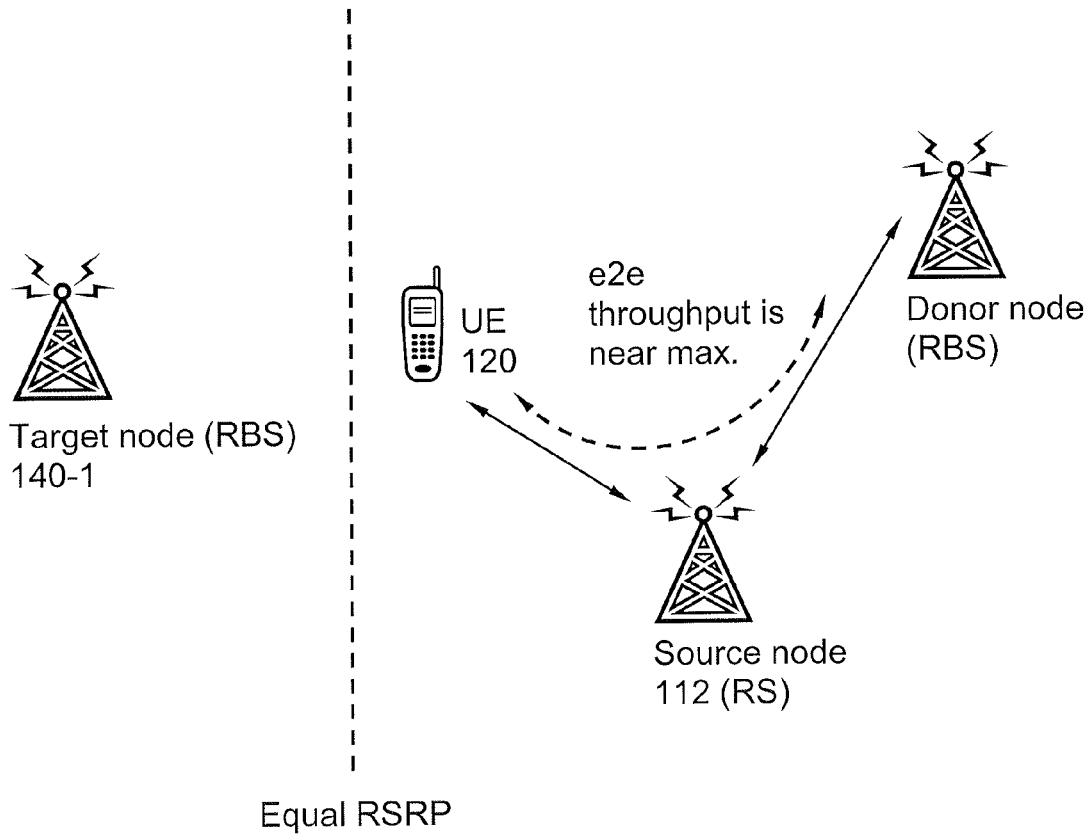
FIG. 4B is a block diagram illustrating an embodiment of a relay station, configured for extra handover, in a wireless communication system.

Also, another scenario wherein the serving network node is a relay station and the method comprises an extra handover is illustrated and presented in FIG. 4A and FIG. 4B. Further, some different scenarios for which the methods disclosed herein may be implemented, wherein the source node and the target node may comprise permutated combinations of radio base stations and relay stations, are presented and illustrated in FIG. 5. Additionally, some embodiments of the method in a radio base station are presented in FIG. 6A and FIG. 6B, respectively while a radio base station is presented in FIG. 7. Further, some embodiments of the method in a relay station are presented in FIG. 8A, FIG. 8B and FIG. 8C, respectively while a relay station is presented in FIG. 9.

Figure 1B:
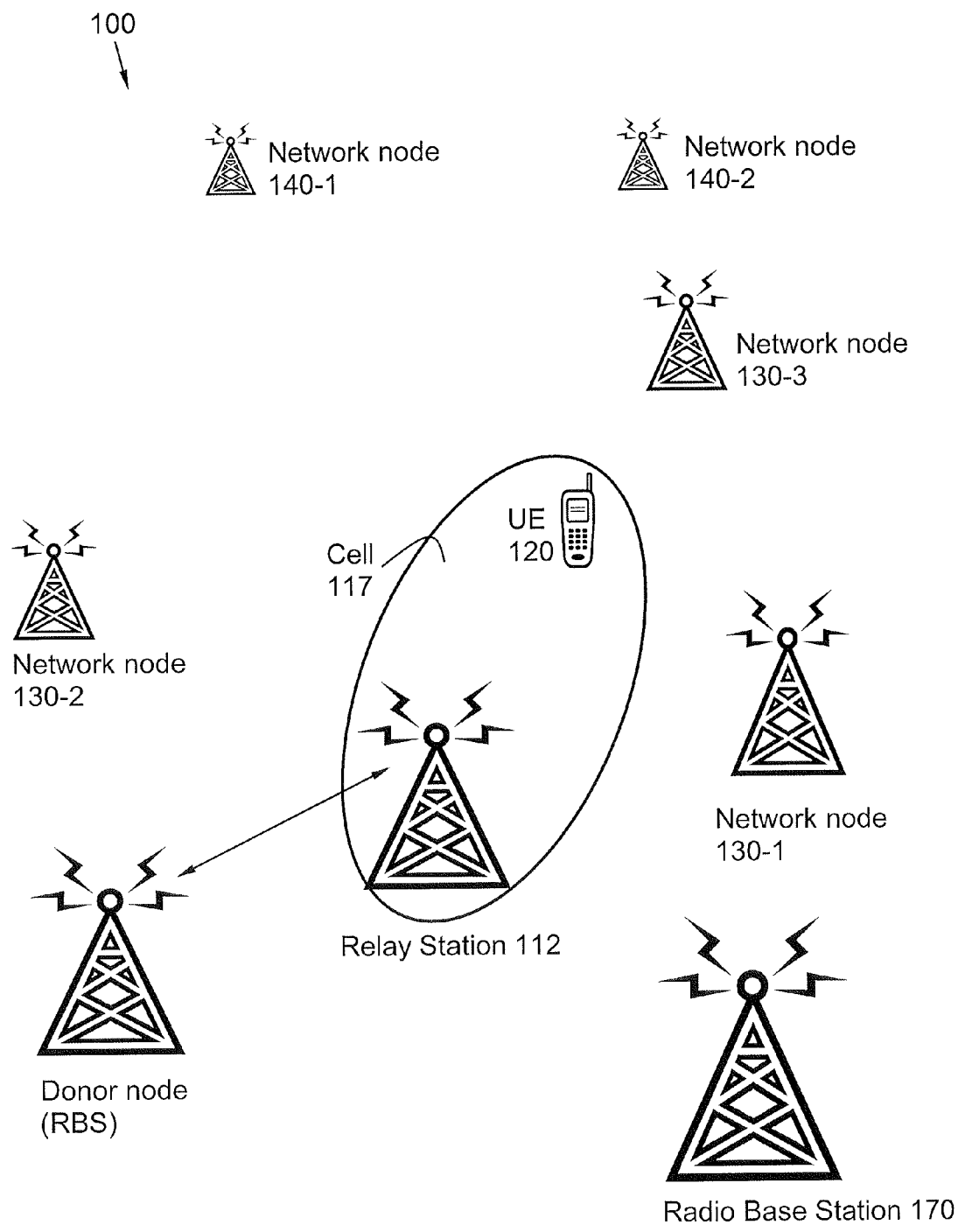
FIG. 1B is a block diagram illustrating a wireless communication system according to some embodiments.

However, firstly, an example of a scenario wherein a relay station is serving a user equipment is presented in FIG. 1B.

FIG. 1B depicts a wireless communication system 100, similar to the wireless communication system 100 illustrated in FIG. 1A.

The purpose of the illustration in FIG. 1B is to provide a general overview of the methods and network nodes herein described, and the functionalities involved. The methods and network nodes will subsequently, as a non-limiting example, be described in a 3GPP/LTE environment, but the embodiments of the disclosed methods and network nodes may operate in a wireless communication system 100 based on another access technology.

The wireless communication system 100 comprises one relay station 112, which is serving a cell 117, wherein a user equipment 120 may be situated, and served by the relay station 112.

The relay station 112 may according to some embodiments be referred to as e.g. a relay station, a relay node or a repeater, according to different terminology.

The user equipment 120 is configured to transmit radio signals comprising information to be received by the serving relay station 112. The user equipment 120 is also configured to receive radio signals comprising information transmitted by the serving relay station 112. The communication between the serving relay station 112 and the user equipment 120 is thus made over a wireless link.

The relay station 112 is in turn connected via a backhaul link to a donor node, which is a radio base station.

The user equipment 120 may be represented by e.g. a wireless communication terminal, a mobile cellular phone, a Personal Digital Assistant (PDA), a wireless platform, a mobile station, a portable communication device, a laptop, a computer, a wireless terminal acting as a mobile relay, a Customer Premises Equipment (CPE), a Fixed Wireless Access (FWA) node or any other kind of device configured to communicate wirelessly via the serving relay station 112.

The serving relay station 112 controls the radio resource management within the cell 117, such as e.g. allocating radio resources to user equipment units 120 within the cell 117 and ensuring reliable wireless communication link between the relay station 112 and the user equipment 120. The relay station 112 may comprise an eNodeB (eNB), e.g. in an LTE-related wireless communication system 100, according to some embodiments.

Also depicted in FIG. 1B are a number of candidate target network nodes 130-1, 130-2, 130-3 and also some more distant candidate target network nodes 140-1, 140-2. In addition also another radio base station 170 is depicted in FIG. 1B.

The candidate target network nodes 130-1, 130-2, 130-3, 140-1, 140-2 may according to some embodiments be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device, a relay station, a relay node and/or a repeater or any other network node configured for radio communication over a wireless interface, depending e.g. of the radio access technology and terminology used.

Embodiments of the method in a relay station disclosed herein comprise a handover algorithm for reducing the negative effects of relay deployment and provide improvements concerning handover decisions. The handover strategy is changed, compared with prior art solutions, in order to take into account the backhaul link limitation as well in a heterogeneous network environment. To be more precise, connecting the user equipment 120 to another relay station by only evaluating the conventional RSRP signal, as is made in prior art solutions, may lead to situations where user equipment unit 120 with good current average bitrate between the user equipment 120 and the currently serving relay station 112 is connected to another relay station resulting in lower performance.

According to embodiments of the method disclosed herein, another criterion for handover is taken into account besides, or instead of, prior art RSRP signal measurement reports. Thus, the average e2e throughput, or equivalent channel quality information and, according to some embodiments, cell load such as e.g. cell fractional load may be taken into account in an algorithm for determining if a handover request is to be sent according to some embodiments.

FIG. 2A illustrates an overview of an embodiment of the method in a radio base station 110 for deciding if a handover request of a user equipment 120 is to be sent to a candidate target network node 130-1, 130-2, 130-3 or not.

The method is performed in the radio base station 110, which is serving the user equipment 120. Concerning the user equipment 120, the serving radio base station 110 may decide to handover the user equipment 120 to the candidate target network node 130-1, 130-2, or 130-3 by sending a handover request to be received by the candidate target network node 130-1, 130-2, or 130-3. Also the candidate target network nodes 130-1, 130-2, 130-3 may comprise a radio base station, or a relay station, according to different embodiments. The serving radio base station 110 may be the donor base station to any candidate target network node 130-1, 130-2, or 130-3, comprising a relay station, according to some embodiments. However, it is to be noted that the candidate target network node 130-1, 130-2, or 130-3, comprising a relay station may have another radio base station as donor base station which is different from the serving radio base station 110.

A number of illustrated actions may be comprised according to some embodiments of the method in a radio base station. However, not all of the illustrated actions may be comprised in all embodiments.

The user equipment 120 may receive wireless reference signals from the serving radio base station 110 and the candidate target network nodes 130-1, 130-2, 130-3. The serving radio base station 110 may instruct, or trigger, the user equipment 120 to send a signal measurement report comprising measured reference signals, e.g. RSRP, from neighbouring network nodes 110, 130-1, 130-2, 130-3.

When receiving the signal measurement report from the user equipment 120, comprising signal strength measurements from candidate target network nodes 130-1, 130-2, 130-3, the candidate target network node 130-1, 130-2, 130-3 may be identified as either a radio base station, or a relay station. Such identification may be made e.g. based on explicit signalling between the involved network nodes 110, 130-1, 130-2, 130-3, or by consulting e.g. a look-up table, according to different embodiments. If the best candidate target network node 130-1 is identified as a radio base station, the target network node is set to the best candidate target network node 130-1, and a handover request may be sent to the best candidate target network node 130-1. Thus, according to some embodiments, the handover request may be sent to the best candidate target network node 130-1, without making any further computations concerning e.g. data-rate performance, according to some embodiments. When in this context relating to the best candidate target network node 130-1, it is to be understood as the candidate target network node 130-1, 130-2, 130-3, from which the user equipment 120 has measured the best, or highest, received reference signals, such as e.g. RSRP.

However, in case the best candidate target network node 130-1 is identified as a relay station, the data-rate performance, the throughput or another measurement related to the signal quality on the radio link between the serving radio base station 110 and the user equipment 120 may be computed.

Thus the data-rate performance of the wireless link between the radio base station 110 and the user equipment 120 may be acquired, such as measured, or received from the user equipment 120, which in turn may have measured the data-rate performance of the wireless link between the radio base station 110 and the user equipment 120.

Also, the load, such as e.g. the fractional load within the cell 115 may be detected according to some embodiments. Based on the detected load, an appropriate data-rate performance threshold value may be selected.

Thereafter, the acquired data-rate performance is compared with the data-rate performance threshold value.

The data-rate performance threshold value may be based e.g. on previously determined throughput of a wireless link between at least one user equipment, via a relay node and the radio base station 110, or a neighbouring radio base station 170. According to some embodiments, the data-rate performance threshold value may have been decided upon beforehand i.e. based on a previously determined throughput over the wireless link.

Based on the comparison between the acquired data-rate performance and the data-rate performance threshold value, it is determined to send the handover request of the user equipment 120 to the best candidate target network node 130-1. Thus, if the acquired data-rate performance is lower than the data-rate performance threshold value, it is determined to send the handover request of the user equipment 120 to the best candidate target network node 130-1, according to some embodiments.

FIG. 2B illustrates an overview of an embodiment of the method in a relay station 112 for deciding if a handover request of a user equipment 120 is to be sent to a candidate target network node 130-1, 130-2, 130-3 or not.

The method is performed in the relay station 112, which is serving the user equipment 120. Concerning the user equipment 120, the serving radio relay station 112 may decide to handover the user equipment 120 to the candidate target network node 130-1, 130-2, or 130-3 by sending a handover request to be received by the candidate target network node 130-1, 130-2, or 130-3. Also the candidate target network nodes 130-1, 130-2, 130-3 may comprise a radio base station, or a relay station. Any of the candidate target network node 130-1, 130-2, or 130-3 may comprise a donor base station in relation to the serving relay station 112. However, the serving relay station 112 may have another donor radio base station. Further, it is to be noted that the candidate target network node 130-1, 130-2, or 130-3, comprising a relay station may have another radio base station as donor radio base station.

A number of illustrated actions may be comprised according to some embodiments of the method in a relay station 112. However, not all of the illustrated actions may be comprised in all embodiments.

The user equipment 120 may receive wireless reference signals from the serving relay station 112 and the candidate target network nodes 130-1, 130-2, 130-3. The serving relay station 112 may instruct, or trigger, the user equipment 120 to send a signal measurement report comprising measured reference signals, e.g. RSRP, from neighbouring network nodes 112, 130-1, 130-2, 130-3.

When receiving the signal measurement report from the user equipment 120, comprising signal strength measurements from candidate target network nodes 130-1, 130-2, 130-3, the candidate target network node 130-1, 130-2, 130-3 may be identified as either a radio base station, or a relay station. Such identification may be made e.g. based on explicit signalling between the involved network nodes 112, 130-1, 130-2, 130-3, or by consulting e.g. a look-up table, according to different embodiments. If the best candidate target network node 130-1 is identified as a radio base station, the target network node may be set to the best candidate target network node 130-1, and a handover request may be sent to the best candidate target network node 130-1. Thus, according to some embodiments, the handover request may be sent to the best candidate target network node 130-1, without making any further computations concerning e.g. data-rate performance, according to some embodiments. When in this context relating to the best candidate target network node 130-1, it is to be understood as the candidate target network node 130-1, 130-2, 130-3, from which the user equipment 120 has measured the best, or highest, received reference signals, such as e.g. RSRP.

However, in case the best candidate target network node 130-1 is identified as a relay station, the data-rate performance, the throughput or another measurement related to the signal quality on the radio link between the serving relay station 112 and the user equipment 120 may be computed.

Thus the data-rate performance of the wireless link between the relay station 112 and the user equipment 120 may be acquired, such as measured, or received from the user equipment 120, which in turn may have measured the data-rate performance of the wireless link between the relay station 112 and the user equipment 120.

Also, the load, such as e.g. the fractional load within the cell 117 may be detected according to some embodiments. Based on the detected load, an appropriate data-rate performance threshold value may be selected.

Thereafter, the acquired data-rate performance is compared with the data-rate performance threshold value.

The data-rate performance threshold value may be based e.g. on previously determined throughput of a wireless link between at least one user equipment, via a relay node and the donor radio base station, or a neighbouring radio base station 170. According to some embodiments, the data-rate performance threshold value may have been decided upon beforehand i.e. based on a previously determined throughput over the wireless link.

Based on the comparison between the acquired data-rate performance and the data-rate performance threshold value, it is determined to send the handover request of the user equipment 120 to the best candidate target network node 130-1. Thus, if the acquired data-rate performance is lower than the data-rate performance threshold value, it is determined to send the handover request of the user equipment 120 to the best candidate target network node 130-1, according to some embodiments.

FIG. 2C illustrates an overview of an alternative embodiment of the method in a relay station 112 for deciding if a handover request of a user equipment 120 is to be sent to a candidate target network node 130-1, 130-2, 130-3 or not.

According to this embodiment, it is detected that none of the candidate target network node 130-1, 130-2, 130-3 comprised in the list received from the user equipment 120 is identified as a radio base station. Or, expressed in another way, all candidate target network nodes 130-1, 130-2, 130-3 comprised in the list received from the user equipment 120 may be identified as relay stations.

Thus the data-rate performance of the wireless link between the relay station 112 and the user equipment 120 may be acquired, such as measured, or received from the user equipment 120, which in turn may have measured the data-rate performance of the wireless link between the relay station 112 and the user equipment 120. Thereafter, the acquired data-rate performance is compared with the data-rate performance threshold value.

According to some embodiments, the data-rate performance may be compared with an extra handover threshold value. If the acquired data-rate performance exceeds the extra threshold value, i.e. if the acquired data-rate performance exceeds a fraction of maximum throughput of the serving relay station 112, it may trigger the user equipment 120 to report reference signals from further candidate target network nodes 140-1, 140-2.

In case the acquired data-rate performance of the wireless link between the relay station 112 and the user equipment 120 exceeds the extra handover threshold value, an extra handover request may be triggered.

Thereafter, the user equipment 120 may receive and report reference signals from the further candidate target network node 140-1, 140-2. A measurement report comprising a list of further candidate target network nodes 140-1, 140-2 may be transmitted to be received by the serving relay station 112. Upon receiving the measurement report, it may be determined to send the handover request of the user equipment 120 to the further candidate target network nodes 140-1, 140-2. According to some embodiments, it may be determined to send handover request of the user equipment 120 to any further candidate target network node 140-1, 140-2 comprising a radio base station. If several further candidate target network nodes 140-1, 140-2 comprise radio base stations, the further candidate target network node 140-1, 140-2 from which the highest signal power has been received may be selected as the one to receive the handover request.

FIG. 2D illustrates an example of a case wherein a user equipment 120 is served by a radio base station 110, and a candidate target network node 130-1 is a relay station in a low load environment. The average level of load of the network nodes 110, 130-1, 130-2, 130-3 is low. Thus the data-rate performance threshold value (ThV) may be set to: $\beta \cdot Rmax$, i.e. a portion of the maximal throughput of the wireless link between the serving radio base station 110 and the user equipment 120. The parameter $\beta$ is approaching the value of $\min(1-\alpha,\alpha)$ when the cell load is low. The parameter $\alpha$ is in turn the resource utilization for the backhaul link and $0<\alpha<1$. If optimal resource utilization is assumed, $\alpha$ may be set to 0.5. In such case, the maximal throughput a relay station may provide, in case the user equipment 120 is handed over to the candidate target network node 130-1 is $0.5 \cdot Rmax$. Thus there may be no point in handing over the user equipment 120 if the data-rate performance between the serving radio base station 110 and the user equipment 120 exceeds the data-rate performance threshold value, i.e. the maximal throughput the candidate target relay station would be able to provide. However, if the data-rate performance between the serving radio base station 110 and the user equipment 120 is lower than the data-rate performance threshold value, the user equipment 120 may get a higher data-rate performance if it instead would be served by the candidate target network node 130-1. In such case, a handover request may be sent to the candidate target network node 130-1.

FIG. 2E illustrates an example of a case wherein a user equipment 120 is served by a radio base station 110, and a candidate target network node 130-1 is a relay station in a high load environment. The average level of load of the network nodes 110, 130-1, 130-2, 130-3 is high. Thus the data-rate performance threshold value (ThV) may be set to: β·Rmax, i.e. a portion of the maximal throughput of the wireless link between the serving radio base station 110 and the user equipment 120. The parameter β is approaching 0 when the cell load is high, such as for example 0.01, 0.05, 0.1, 0.2 or any other number there between, to mention some examples. Thus there may be no point in handing over the user equipment 120 if the data-rate performance between the serving radio base station 110 and the user equipment 120 exceeds the data-rate performance threshold value, i.e. the maximal throughput the candidate target relay station with a high load would be able to provide. However, if the data-rate performance between the serving radio base station 110 and the user equipment 120 is lower than the data-rate performance threshold value, the user equipment 120 may get a higher data-rate performance if it instead would be served by the candidate target network node 130-1. In such case, a handover request may be sent to the candidate target network node 130-1.

FIG. 2F illustrates an example of a case wherein a user equipment 120 is served by a relay station 112, and a candidate target network node 130-1 is a radio base station. The data-rate performance threshold value (ThV) may be set to: γ·Re2emax, i.e. a portion of the maximal throughput of the wireless link between the serving relay station 112 and the user equipment 120. Re2emax may in turn set to min(1−α,α)·Rmax. The parameter α is in turn the resource utilization for the backhaul link and 0<α<1. If optimal resource utilization is assumed, α may be set to 0.5. So, if the data-rate performance between the serving relay station 112 and the user equipment 120 is lower than the data-rate performance threshold value, the user equipment 120 may get a higher data-rate performance if it instead would be served by the candidate target network node 130-1. In such case, a handover request may be sent to the candidate target network node 130-1.

FIG. 2G illustrates an example of a case wherein a user equipment 120 is served by a relay station 112, and a hypothetical candidate target network node 140-1 is a radio base station. The hypothetical candidate target network node 140-1 has not been reported by the user equipment 120 to the relay station 112. The data-rate performance threshold value (ThV) may be set to: γ·Re2emax, i.e. a portion of the maximal throughput of the wireless link between the donor radio base station, via the serving relay station 112 and the user equipment 120. Re2emax may in turn set to min(1−α, α)·Rmax. The parameter α is in turn the resource utilization for the backhaul link and 0<α<1. If optimal resource utilization is assumed, α may be set to 0.5. So, if the data-rate performance between the serving relay station 112 and the user equipment 120 exceeds the data-rate performance threshold value, the user equipment 120 may get a higher data-rate performance if it instead would be served by the candidate target network node 140-1, which is a radio base station. In such case, an extra handover request may be sent to the candidate target network node 140-1.

FIG. 2H illustrates an example of a case wherein a user equipment 120 is served by a relay station 112, and a candidate target network node 130-1 is also a relay station in a low load environment. The average level of load of the network nodes 112, 130-1, 130-2, 130-3 is low. Thus the data-rate performance threshold value (ThV) may be set to: β·Rmax. The parameter β is approaching the value of min(1−α,α) when the cell load is low. The parameter α is in turn the resource utilization for the backhaul link and 0<α<1. If optimal resource utilization is assumed, α may be set to 0.5. In such case, the maximal throughput a relay station may provide, in case the user equipment 120 is handed over to the candidate target network node 130-1 is 0.5·Rmax. Thus there may be no point in handing over the user equipment 120 if the data-rate performance between the serving relay station 112 and the user equipment 120 exceeds the data-rate performance threshold value, i.e. the maximal throughput the candidate target relay station would be able to provide. However, if the data-rate performance between the serving relay station 112 and the user equipment 120 is lower than the data-rate performance threshold value, the user equipment 120 may get a higher data-rate performance if it instead would be served by the candidate target network node 130-1. In such case, a handover request may be sent to the candidate target network node 130-1.

FIG. 2I illustrates an example of a case wherein a user equipment 120 is served by a relay station 112, and a candidate target network node 130-1 is a relay station in a high load environment. The average level of load of the network nodes 112, 130-1, 130-2, 130-3 is high. Thus the data-rate performance threshold value (ThV) may be set to: β·Rmax. The parameter β is approaching 0 when the cell load is high, such as for example 0.01, 0.05, 0.1, 0.2 or any other number there between, to mention some non-limiting examples. Thus there may be no point in handing over the user equipment 120 if the data-rate performance between the serving relay station 112 and the user equipment 120 exceeds the data-rate performance threshold value, i.e. the maximal throughput the candidate target relay station with a high load would be able to provide. However, if the data-rate performance between the serving relay station 112 and the user equipment 120 is lower than the data-rate performance threshold value, the user equipment 120 may get a higher data-rate performance if it instead would be served by the candidate target network node 130-1. In such case, a handover request may be sent to the candidate target network node 130-1.

Figure 3:
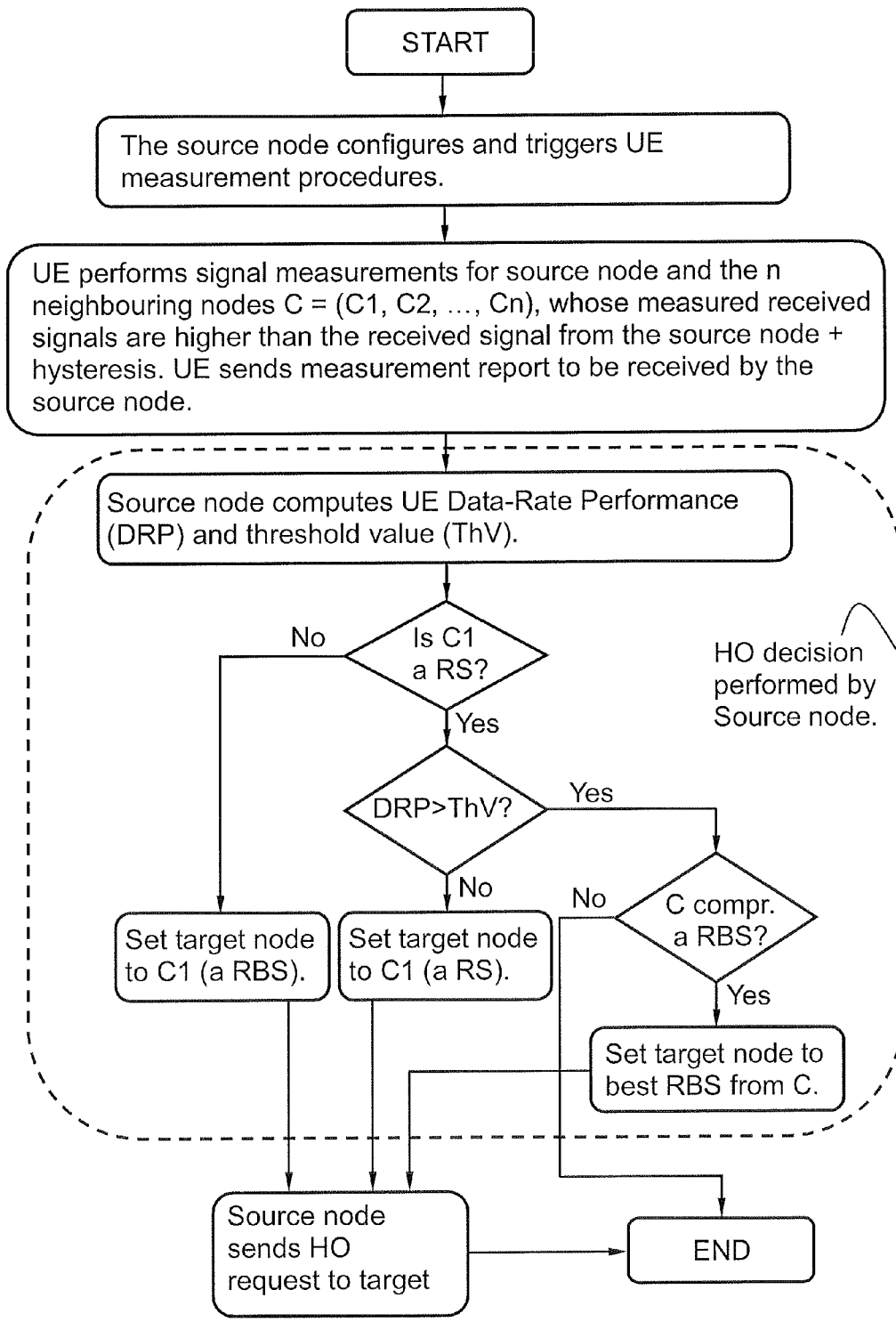
FIG. 3 is a block diagram illustrating an example of an embodiment of a method in a wireless communication system.

FIG. 3 illustrates a method in a source node 110, 112, which may comprise a radio base station 110 or a relay station 112 for deciding if a handover request is to be sent, according to some embodiments. The method is performed either in a radio base station 110 or a relay station 112, serving the user equipment 120 according to different embodiments. The serving radio base station 110, or serving relay station 112, may also be referred to as a source network node, in a handover scenario. The prospect receiving network node 130-1, 130-2, 130-3 is herein referred to as candidate target network nodes.

In a first action, relating to measurement control, the serving radio base station 110, or serving relay station 112, may configure and trigger the user equipment 120 to measure the signal strength of reference signals, transmitted by neighbouring network nodes 130-1, 130-2, 130-3, received and measured by the user equipment 120. Embodiments of the serving radio base station 110, or serving relay station 112 respectively, may further configure the user equipment 120 to send measurement reports e.g. at a certain interval.

Also, the serving radio base station 110, or serving relay station 112, may in addition configure the user equipment 120 to send measurement reports comprising only signal measurements higher than e.g. a threshold value, or higher than the measured strength of a reference signal emitted from the serving radio base station 110, or serving relay station 112, +some hysteresis value (e.g. for avoiding ping-pong effects), according to different embodiments. These signal measurements of reference signals may in LTE/LTE-Advanced be referred to as Reference Signal Received Power (RSRP) measurements, however, any other convenient signal measurement concerning the strength or quality of a received signal, emitted from any network node 110, 112, 130-1, 130-2, 130-3, 140-1, 140-2 may be used. Having stated that, the term RSRP will be used for the rest of the presentation of the illustrated embodiment in FIG. 3.

In a subsequent action, the user equipment 120 may perform the measurement of received signal power for neighbouring network nodes 130-1, 130-2, 130-3 and also the serving radio base station 110, or serving relay station 112. According to some embodiments, the n best neighbouring network nodes 130-1, 130-2, 130-3, i.e. the n neighbouring network nodes 130-1, 130-2, 130-3 from which the user equipment 120 has received and measured the strongest reference signals may be determined. The parameter n may be set to any convenient integer such as e.g. 1, 2, 3, 4, 5, or any appropriate multiple of these numbers. According to some embodiments, the user equipment 120 may prepare a measurement report comprising the n best neighbouring network nodes 130-1, 130-2, 130-3, whose RSRP is greater than RSRP for the serving network node 110+some hysteresis value, over a certain time period (Time To Trigger). A set of measurements from the n best neighbouring network nodes 130-1, 130-2, 130-3 may be reported to the serving radio base station 110, or serving relay station 112 in form of a set of candidate target network nodes C={C1, C2, . . . , Cn}.

Inside the set C, the candidate target network nodes C1, C2, . . . , Cn may comprise either a radio base station (RBS) or a relay station (RS), where the radio base station may comprise a macro base station, a micro base station or pico base station, and relay station refers to an inband relay station. Then user equipment 120 may send a measurement report, or a sequence of measurement reports, comprising the set C and the RSRP measurements, to the serving radio base station 110, or serving relay station 112.

Then, upon receiving the measurement report from the user equipment 120, the serving radio base station 110, or serving relay station 112 may form a handover request decision, based on a number of considerations according to different embodiments.

The serving radio base station 110, or serving relay station 112 may acquire, such as e.g. measure, the Data-Rate Performance (DRP) of the user equipment 120, and the Data-Rate Performance Threshold Value (ThV).

The data-rate performance of the user equipment 120 may be computed by determining the throughput in the downlink, or the uplink, or both the downlink and the uplink in an end to end connection from the user equipment 120 to/from the serving radio base station 110, or serving relay station 112. These different algorithms for acquiring the data-rate performance of the user equipment 120, or the throughput, may be referred to as a downlink based algorithm, an uplink based algorithm and an algorithm based on both downlink and uplink data transmissions.

The downlink based algorithm thus comprises average throughput in the downlink, utilized in the handover decision. According to some embodiments, the average throughput in the downlink may be utilized in the Handover Decision part of the handover algorithm.

The uplink based algorithm thus comprises average throughput in the uplink, utilized in the handover decision. According to some embodiments, the average throughput in the uplink may be utilized in the Handover Decision part of the handover algorithm.

The embodiments based on both the uplink and downlink based algorithm may comprise the average throughputs both in the uplink and the downlink, utilized in the handover decision. According to some embodiments, the average throughputs in the uplink and the downlink may be utilized in the Handover Decision part of the handover algorithm.

The selection of the handover algorithm may be based on implementation complexity; for example, both the downlink-based algorithm and uplink-based algorithm may have less complexity than the downlink & uplink-based algorithm. The selection of the handover algorithm may also be based on the availability of the channel quality information, average throughput and CQI, in the downlink and uplink.

The serving radio base station 110, or serving relay station 112, may further pick the first candidate target network node 130-1, or C1 in FIG. 3, comprised in the set C of candidate target network nodes 130-1, 130-2, 130-3. Thus the serving radio base station 110, or serving relay station 112, may check if the first candidate target network node 130-1, or C1, which may be the candidate target network node 130-1, 130-2, 130-3 with the strongest RSRP, is a relay station or not. If the first candidate target network node 130-1, or C1, is identified as a radio base station, the serving radio base station 110, or serving relay station 112, may determine to instantly send a handover request of the user equipment 120 to the first candidate target network node 130-1, or C1.

In such case, the serving radio base station 110, or serving relay station 112, may in addition send a handover request to the first candidate target network node 130-1, or C1.

However, if the first candidate target network node 130-1, or C1, is a relay station, a comparison between the data-rate performance of the user equipment 120, and the data-rate performance threshold value may be made.

The data-rate performance of the user equipment 120, i.e. the average throughput in the downlink, the uplink, or both the uplink and downlink according to different embodiments may be computed by the serving radio base station 110, or serving relay station 112.

According to embodiments based on the downlink-based handover algorithm, it may be computed by averaging the downlink throughput of the user equipment 120 over a window of time. The window of time may comprise a number of Transmission Time Interval (TTI). A downlink data-rate performance threshold value may also be computed by the serving radio base station 110, or serving relay station 112, wherein the data-rate performance threshold value is set such that user equipment 120 may not be connected to a relay station if the data-rate performance is higher than the data-rate performance threshold value according to some embodiments.

According to embodiments based on the uplink-based handover algorithm, it may be computed by averaging the uplink throughput of the user equipment 120 over a window of time. The window of time may comprise a number of Transmission Time Interval (TTI). An uplink data-rate performance threshold value may also be computed by the serving radio base station 110, or serving relay station 112, wherein the data-rate performance threshold value is set such that user equipment 120 may not be connected to a relay station if the data-rate performance is higher than the data-rate performance threshold value.

According to embodiments based on both the average uplink and downlink throughput of the user equipment 120, the average uplink and downlink throughputs may be computed by the serving radio base station 110, or serving relay station 112. They may be computed by averaging the uplink throughput and the downlink throughput of the user equipment 120 over a window of time. The window of time may comprise a number of Transmission Time Interval (TTI). Uplink and downlink data-rate performance threshold values, for which the serving radio base station 110, or serving relay station 112, may not handover the user equipment 120 to a relay station may be calculated. A handover request for the user equipment 120 may thus not be sent to a candidate target network node 130-1, 130-2, 130-3 comprising a relay station, if both the uplink data-rate performance is higher than the uplink data-rate performance threshold value and the downlink data-rate performance is higher than the downlink data-rate performance threshold value.

If C1, or candidate target network node 130-1, i.e. the cell with the strongest RSRP, is a radio base station, or if C1 (candidate target network node 130-1) is a relay station and the data-rate performance of the user equipment 120 is lower than the data-rate performance threshold value, then C1/candidate target network node 130-1 is selected as the target network node for the user equipment 120. If C1, or candidate target network node 130-1, is a relay station and the data-rate performance of the user equipment 120 exceeds the data-rate performance threshold value, then the best available radio base station comprised in the set C of candidate target network nodes 130-1, 130-2, 130-3 may be selected as the target network node. Otherwise, if the set C of candidate target network nodes 130-1, 130-2, 130-3 does not comprise any radio base stations, then it may be determined not to make any handover, and consequently not to send any handover request. Thus no target network node is selected in such case and the serving radio base station 110, or serving relay station 112 may continue serve the user equipment 120.

In some embodiments, the method in a serving radio base station 110, or serving relay station 112 may comprise basing the data-rate performance threshold value of the user equipment 120 on the maximum capacity and/or the theoretical throughput of a relay station, i.e. the serving relay station 112 in such case.

The data-rate performance threshold value may be based on the maximum (e2e) throughput a relay station may provide in a link between a source network node, over a relay station, to the user equipment 120. In the downlink, as an example, the maximum (e2e) throughput a relay station may provide may be given by:

$$Re2e,DL,max=min(\alpha \cdot Rbackhaul,DL,max,(1-\alpha) \cdot Raccess,DL,max),$$

where $\alpha$ is the resource utilization for the backhaul link between the relay station and the donor node, a radio base station, and $0<\alpha<1$. If Rbackhaul,DL,max=Raccess,DL,max=RDL,max, then:

$$Re2e,DL,max=min(\alpha, 1-\alpha) \cdot RDL,max.$$

The maximum downlink throughput, RDL,max, may be a fixed value for a fixed set of physical-layer parameters, like e.g. bandwidth, antenna configurations, etc. For example, in LTE, RDL,max may be 113 Mbps if 2×2 Multiple-Input and Multiple-Output (MIMO) with 64-Quadrature Amplitude Modulation (QAM) modulation is used in a 20 MHz bandwidth; in LTE uplink, RUL,max may be 50 Mbps if 1×2 Single Input Multiple Output (SIMO) with 16-QAM modulation is used in a 20 MHz bandwidth.

Given that there is no gain for the user equipment 120 in being served by a relay station 112 at the high cell fractional load, the handover threshold in some embodiments may be designed to be equal to RDL,max (or RUL,max) adjusted by a parameter β. Take downlink as an example, the data-rate performance threshold value (ThV) may be defined as:

$$ThV=\beta \cdot RDL,max$$

where β is designed to approach the value of $min(1-\alpha,\alpha)$ when the cell fractional load is low, and to approach 0 when the cell fractional load becomes very high. The value of β may also depend on other factors.

Therefore, the data-rate performance threshold value may be set to be any value between 0 and Re2e,DL,max by adjusting the value of the parameter β, according to some embodiments.

In some embodiments, the data-rate performance threshold value may be set up in two steps.

Step 1

If a fixed set of physical-layer parameters is used in the considered network, then the maximum downlink throughput (RDL,max), the maximum uplink throughput (RUL,max), and the resource utilization factor (α) may be pre-determined or configurable, and so the maximum (e2e) throughput (Re2e,DL,max or Re2e,UL,max) the relay station 112 concerned may provide may also be pre-determined or configurable.

If different physical-layer parameters are used by different cells, exchange of information between the serving radio base station 110, or serving relay station 112, and its neighbouring candidate target network nodes 130-1, 130-2, 130-3 may be utilised. Then Re2e,DL,max (or Re2e,UL,max) may be computed according to the exchanged information.

Step 2

Exchange of information on the cell fractional load between the serving radio base station 110, or serving relay station 112, and its neighbouring candidate target network nodes 130-1, 130-2, 130-3 may be utilised. Then β may be computed by the serving radio base station 110, or serving relay station 112, and the data-rate performance threshold value (ThV) may be calculated by the previously described formula. The value of β may also depend on other factors, which may or may not utilise information acquired from any, some or all of the neighbouring candidate target network nodes 130-1, 130-2, 130-3.

The data-rate performance threshold value may be comprised in a set of a plurality of data-rate performance threshold values according to some embodiments. Thereby an appropriate data-rate performance threshold value may be selected based on e.g. modulation and coding scheme, MIMO scheme, mobility of the user equipment 120 (Doppler), load of the serving radio base station 110, or relay station 112, such as e.g. fractional load, etc.

According to some embodiments, the data-rate performance threshold value may comprise the max downlink end to end capacity of a wireless link from a donor node (radio base station), via a source node (relay station) to be received by the user equipment 120. According to some embodiments, the data-rate performance threshold value may be set to 56.5 Mbps in a non-limiting example.

According to some embodiments, the data-rate performance threshold value may comprise the max uplink end to end capacity of a wireless link from a user equipment 120, via a source node (relay station) to be received by the donor node (radio base station). According to some embodiments, the data-rate performance threshold value may be set to 25 Mbps in a non-limiting example.

Further, the data-rate performance threshold value may be selected from the set of data-rate performance threshold values, as a function of the load of the serving radio base station 110, or serving relay station 112, such that a lower data-rate performance threshold value may be selected as the average level of load of the serving radio base station 110, or serving relay station 112, becomes higher; that is, the algorithm prevents connection of the user equipment 120 to a candidate target network node 130-1, 130-2, 130-3 comprising a relay station when the average level of load of the serving radio base station 110, or serving relay station 112, becomes higher.

FIG. 4A illustrates a method in a relay station 112 for deciding if a handover request is to be sent, according to some alternative embodiments. The method is performed in the relay station 112, serving the user equipment 120. The serving relay station 112 may also be referred to as a source network node, or source relay station, in a handover scenario. The illustrated embodiment may be performed in a scenario wherein the serving relay station 112 has a donor network node, which is a radio base station. The throughput as experienced at the serving relay station 112, i.e. the e2e throughput is reduced due to the fact that in-band relay stations are not able to send and receive on the same channel, at the same time, i.e., they use a half-duplex communication mode. Thus the serving relay station 112, may provide a reduced throughput for the user equipment 120.

The illustrated embodiment of the method in a relay station 112 provides an extra handover, in comparison with prior art solutions, for user equipment 120 connected to the serving relay station 112 with an e2e throughput at, or close to, the maximum throughput the relay station may provide. Extra handover in the present context means that the serving relay station 112 may try to handover the user equipment 120 to a candidate target network node 140-1, which is a radio base station, earlier than any prior art RSRP based handover algorithm triggers a handover.

In this case, no RSRP measurement of any neighbouring radio base station has been reported to the serving relay station 112, and the relay station 112 may ask, or trigger the user equipment 120 to report RSRP measurements of neighbouring radio base stations even if the RSRPs of the radio base stations are weaker than that of the current wireless link to the serving relay station 112. Then the e2e throughput in the target network node 140-1 may be estimated by the source network node based on the RSRP measurements from the target network node 140-1. Given that the source relay station 112 knows the channel quality of the current link for the serving relay station 112 it may also estimate a delta in dB that the radio base station's RSRP could be worsen by, and radio base station (i.e. target network node 140-1) still gives a higher e2e throughput. If the estimated e2e throughput in the target network node 140-1 is higher than the maximum throughput a relay station may provide, or an extra handover threshold value, then the serving relay station 112 may try to handover the user equipment 120 to the target network node 140-1, which is a radio base station.

FIG. 4B illustrates a method in a relay station 112, for deciding if a handover request is to be sent, according to some embodiments. The method is performed in the serving relay station 112, serving the user equipment 120 e.g. in a scenario as illustrated in FIG. 4A.

The serving relay station 112 may also be referred to as a source network node, or source relay station in a handover scenario.

In a first action, the serving relay station 112, finds that user equipment data-rate performance exceeds an extra handover threshold value. The extra handover threshold value may comprise a portion of the maximum throughput of the relay station 112. Thus, the extra handover threshold value may be set to: $\gamma \cdot$max e2e throughput, where $\gamma$ is smaller than, but close to 1. The extra handover threshold value may be based on the maximum throughput in the downlink, in the uplink, or in both the downlink and the uplink, according to different embodiments. The extra handover threshold value may be set to the same as, or different from, the data-rate performance threshold value.

The selection of the handover algorithm may be based on implementation complexity; for example, both the downlink-based algorithm and the uplink-based algorithm may have less complexity than the algorithm based on both uplink and downlink throughput. The selection of the handover algorithm may also be based on the availability of the channel quality information, i.e. average throughput and Channel Quality Indicator (CQI), in the downlink and/or uplink, according to some embodiments.

The serving relay station 112 may compute RSRP delta, based on the computed data-rate performance and a CQI. The serving relay station 112 may send RSRP delta to the user equipment 120 and may thereby trigger the user equipment 120 to perform an extra measurement procedure according to some embodiments.

Thereafter, having received the trigger from the serving relay station 112, the user equipment 120 may perform RSRP measurements for the source network node 110 and the best k neighbouring candidate target network nodes 130-1, 130-2, 130-3, 140-1, 140-2; C={C1, C2, . . . , Ck}, whose RSRP>RSRP source node+hysteresis−RSRP delta. The user equipment 120 may then send a measurement report to the source relay station 112. The parameter k may be set to any convenient integer such as e.g. 1, 2, 3, 4, 5, or any multiple of these numbers. Thereafter, based on the measurement reports, a decision to send the handover request may be taken. Thus the serving relay station 112 may select Ci (or candidate target network node 140-1), which is a radio base station, as the further target network node. Having so decided, the serving relay station 112 may send a handover request to the further target network node 140-1.

For the downlink-based handover algorithm, the average downlink throughput of the user equipment 120 and downlink channel quality indicator are utilized by the serving relay station 112 in the measurement control action. That is, only the downlink channel quality information may be used in the algorithm according to the downlink based embodiment. An extra trigger for measurement reports may be an advantage since the user equipment 120 thereby must report the radio base stations even though their RSRP are below that of the serving relay station 112 itself. The four actions illustrated in FIG. 4A, performed by the downlink-based handover algorithm may be further explained, in the scenario depicted in FIG. 4B, in the following:

A downlink extra handover threshold value may thus be computed by the serving relay station 112 as a portion of the e2e throughput which may be at, or close to the max e2e throughput, according to some embodiments. If the serving relay station 112 finds that the throughput exceeds the extra handover threshold value, the serving relay station 112 triggers the user equipment 120 to perform additional signal measurements, and compiling a measurement report comprising measurement of RSRP, or other signal strength measurements, for the serving relay station 112 and over neighbouring candidate target network nodes 130-1, 130-2, 130-3, 140-1, 140-2 and determines the best k cells C={C1, C2, ..., Ck}, whose RSRP is greater than the RSRP of the serving relay station 112+a hysteresis–RSRP delta ($\delta$) over a certain time period (Time To Trigger). The handover hysteresis value assumes non-negative values. Inside the set C, Ci for any i=1–k is either a radio base station or a relay station, where the radio base station may be a macro base station, micro base station or pico base station, for example.

Then the user equipment 120 sends the measurement report, comprising the set C of candidate target network nodes 130-1, 130-2, 130-3, 140-1, 140-2 and the RSRP measurements to the serving relay station 112. When the serving relay station 112 receives the measurement report, the best available network node in the set C, 140-1, which is a radio base station, may be selected as the target network node. Thereafter, having selected the target network node 140-1, the serving relay station 112 may send a handover request to the selected target network node 140-1.

Figure 5:
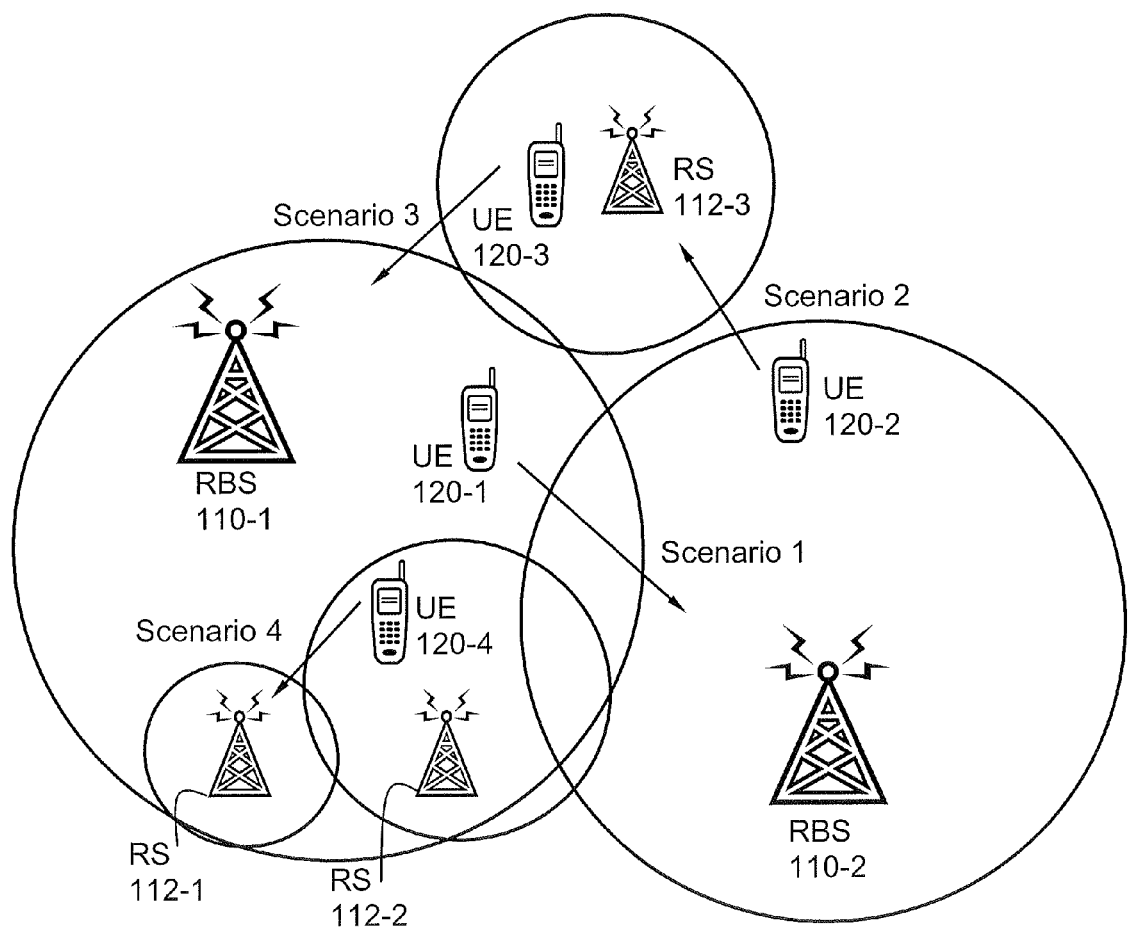
FIG. 5 is a block diagram illustrating different examples of handover scenarios.

FIG. 5 illustrates four examples of scenarios, which may occur when a handover request may be sent in a heterogeneous network 100. The four possible handover scenarios illustrated in FIG. 5 are also summarized in Table 1 with downlink-based handover algorithm as an example in order to provide an overview. However, the summary in Table 1 and the following discussions also apply to uplink-based handover algorithm and a handover algorithm based on both uplink and downlink data-rate performance DRP and data-rate performance threshold value ThV.

TABLE 1

| Scenario | Type of Source node | Type of strongest cell (C1) in the measurement report | Check if average UE DL data-rate performance (DRP) is lower than threshold value (ThV). | Target node |
|---|---|---|---|---|
| 1 | RBS | RBS | NA | C1 |
| 2 | RBS | RS | DRP < ThV | C1 |
|  |  |  | DRP > ThV and C comprises a RBS, Ci | Ci |
|  |  |  | DRP > ThV and C does not comprise any RBS | not selected |
| 3 | RS | RBS | NA | C1 |
| 4 | RS | RS | DRP < ThV | C1 |
|  |  |  | DRP > ThV and C comprises a RBS Ci | Ci |
|  |  |  | DRP > ThV and C does not comprise any RBS | not selected |

In the first scenario, scenario 1, the first user equipment 120-1 is moving from the coverage area of the serving first radio base station 110-1, to the coverage area of the candidate target radio base station 110-2, a second radio base station. The candidate target radio base station 110-2 is the network node C1 in the set C of candidate target network nodes with the strongest RSRP. In this case, the second radio base station 110-2 (C1) may be selected as the target network node, to which a handover request may be made, based on the RSRP measurements alone according to some embodiments, i.e. without performing, or disregarding any data-rate performance measurements.

In a second scenario, scenario 2, a second user equipment 120-2 is moving from the coverage area of the serving second radio base station 110-2, which thus is a radio base station, to the coverage area of the candidate target network node 112-3, which is a relay station. The candidate target network node 112-3 is the node C1 in the set C of candidate target network nodes with the strongest RSRP, which has been reported by the user equipment 120-2, to the serving radio base station 110-2. In this case, if average downlink throughput of the second user equipment 120-2, or data-rate performance, is lower than the data-rate performance threshold value, then a decision to send the handover request of the user equipment 120-2 to the target network node 112-3 (C1) may be made. If the average downlink throughput of the user equipment 120-2, or data-rate performance, exceeds the data-rate performance threshold value, then either the node Ci in the set C of candidate target network nodes with the strongest RSRP, which is a radio base station, may be selected as a target network node. Alternatively, or if there is no radio base station in the set C of candidate target network nodes, it may be decided to not make any handover request.

In scenario 3, a third user equipment 120-3 is moving from the coverage area of the serving relay station 112-3, which is a relay station, to the coverage area of the candidate target network node 110-1, which is a radio base station. The candidate target network node 110-1 is the node C1 in the set C of candidate target network nodes with the strongest RSRP. In this case, it may be decided to send the handover request of the user equipment 120-3 to the target network node 110-1.

In scenario 4, a fourth user equipment 120-4 is moving from the coverage area of the source relay station 112-2, which is a relay station, to the coverage area of the candidate target network node 112-1, which is also a relay station. The candidate target network node 112-1 is the node C1 in the set C of candidate target network nodes with the strongest RSRP.

In this latter case, if average downlink throughput of the fourth user equipment 120-4, or data-rate performance, is lower than the data-rate performance threshold value, then a decision to send the handover request of the user equipment 120-4 to the target network node 112-1 (C1) may be made. If the average downlink throughput of the fourth user equipment 120-4, or data-rate performance, is higher than the data-rate performance threshold value, then either the node Ci in the set C of candidate target network nodes with the strongest RSRP, which is a radio base station, may be selected as target network node. Alternatively, or if there is no radio base station in the set C of candidate target network nodes, it may be decided not to make any handover request.

Figure 6A:
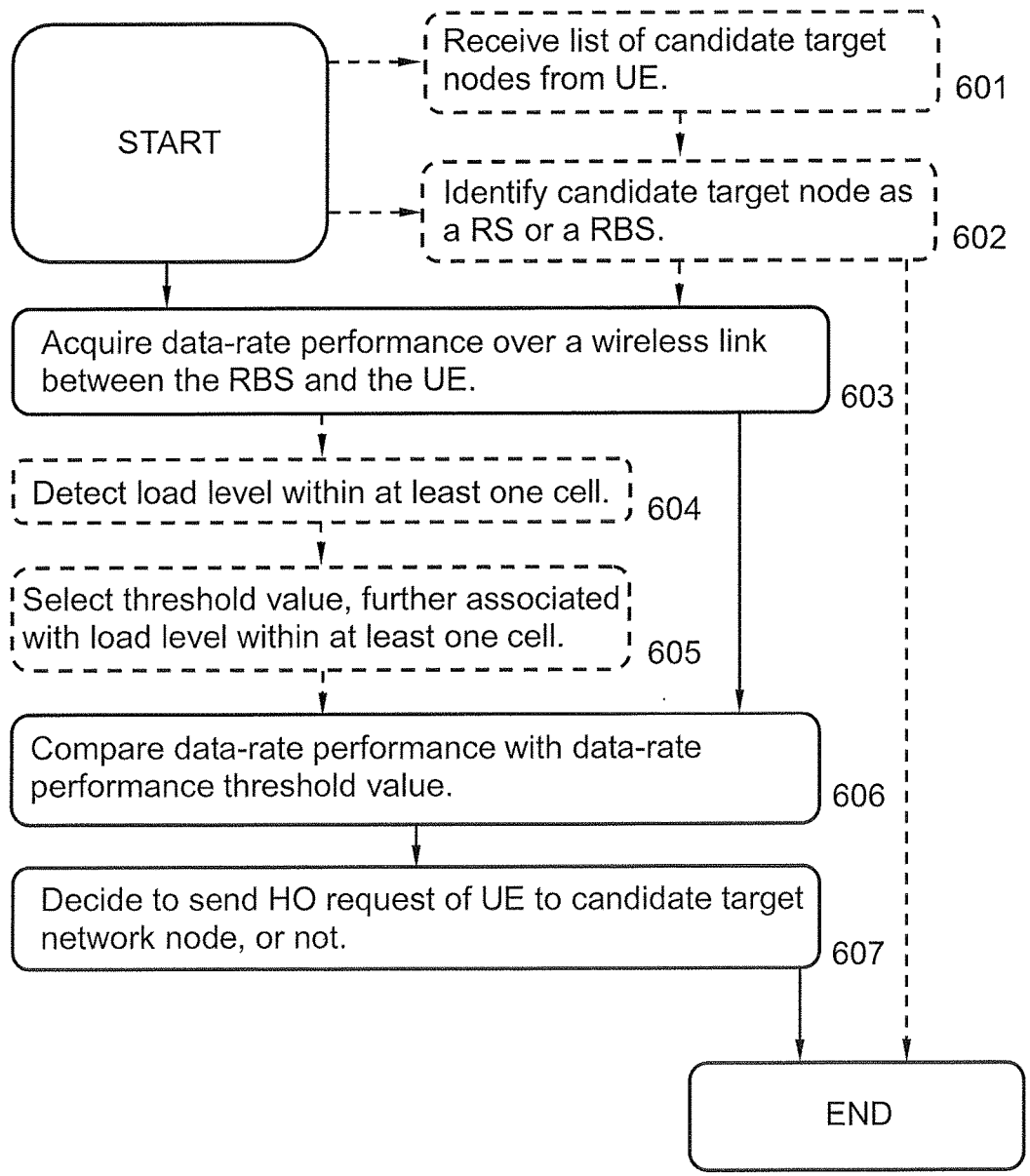
FIG. 6A is a flow chart illustrating examples of actions comprised in embodiments of the method in a radio base station.

FIG. 6A is a flow chart illustrating embodiments of a method in a radio base station 110. The radio base station 110 is serving a user equipment 120. The method aims at deciding if a handover request of the user equipment 120 is to be sent to a candidate target network node 130-1, 130-2, or 130-3.

The radio base station 110, the user equipment 120 and the candidate target network nodes 130-1, 130-2, 130-3 are configured for wireless communication with each other. The radio base station 110 and the candidate target network nodes 130-1, 130-2, 130-3 are comprised in a wireless communication system 100, which is a heterogeneous network, comprising network nodes with differently sized transmission power capacity. Both the radio base station 110 and the candidate target network nodes 130-1, 130-2, 130-3 may comprise a radio base station, such as an Evolved Node B (EnB), a macro base station, a micro base station or a pico base station. Further, any of the candidate target network node 130-1, 130-2, 130-3 may comprise a relay station, configured to operate in half-duplex communication mode, and to operate with a donor radio base station over a backhaul link in half-duplex communication mode. The serving radio base station 110 may according to some embodiments be a donor base station in relation to any of the candidate target network node 130-1, 130-2, 130-3, which is a relay station.

The wireless communication system 100 may be based on Long-Term Evolution (LTE) within the Third Generation Partnership Project (3GPP) according to some embodiments.

The method, according to some embodiments, may be performed only if the user equipment 120 is in active mode. Thereby, it is avoided to make handover of user equipment 120 which anyway is not in active state and thus neither take advantage of the improved performance enabled by the present method in a radio base station, nor contribute to any interference.

To appropriately decide if a handover request of the user equipment 120 is to be sent to the candidate target network node 130-1, 130-2, or 130-3, the method may comprise a number of actions 601-607.

It is however to be noted that some of the described actions, e.g. action 601-603 may be performed in a somewhat different chronological order than the enumeration indicates. Also, it is to be noted that some of the actions such as e.g. 601-602 and/or 604-605 may be performed within some alternative embodiments. Further any, some or all actions, such as for example e.g. 601, 602 and/or 603 may be performed simultaneously or in a rearranged chronological order. The method in a radio base station may comprise the following actions:

Action 601

This alternative action may be comprised within some, but not necessarily all embodiments of the method in a radio base station.

A list of candidate target network nodes 130-1, 130-2, 130-3 may be received from the user equipment 120, which list may be based on measurements of received signal strength, which list may be made by the user equipment 120 based on reference signals received by the user equipment 120 from each respective candidate target network node 130-1, 130-2, 130-3.

Such measurement of received signal strength may comprise a RSRP measurement according to some embodiments, or any other appropriate measurement of signal strength and/or signal quality of received signals.

The list of candidate target network nodes 130-1, 130-2, 130-3 may be predetermined to comprise a certain number of candidates such as e.g. the three candidate target network nodes 130-1, 130-2, 130-3 from which the highest signal strength of a reference signal has been received, according to some embodiments. Note that three is merely an example of an appropriate number of candidate target network nodes 130-1, 130-2, 130-3 to be comprised in the list of candidate target network nodes 130-1, 130-2, 130-3. Other appropriate number may comprise 1, 2, 4, 5, 6, 7 or any appropriate multiple of these numbers. According to other embodiments, only candidate target network nodes 130-1, 130-2, 130-3 from which the user equipment 120 has received signal strength above a threshold value may be comprised in the list. That threshold value may be set to the received signal strength of signals received from the serving radio base station 110, according to some embodiments. Thereby the inclusion of candidate target network nodes 130-1, 130-2, 130-3 into the list, which anyway have too low received signal strength to be considered as successful candidate target network nodes 130-1, 130-2, 130-3 in a handover scenario concerning the user equipment 120, may be omitted. Thereby less data may be transmitted in the uplink from the user equipment 120 to the serving radio base station 110, which may save radio resources.

Further, by configuring the user equipment 120 to only provide a list of candidate target network nodes 130-1, 130-2, 130-3 when the received signal power is above a threshold value, battery power of the user equipment 120 may be saved, thereby prolonging the operational time of the user equipment 120.

Action 602

This alternative action may be comprised within some, but not necessarily all embodiments of the method in a radio base station.

The candidate target network nodes 130-1, 130-2, 130-3 may be identified as a relay station or a radio base station.

Such identification may comprise for example information exchange, such as requests, and/or reports made for example over an intra-network node communication interface, such as e.g. X2, Alda, Iub, Iur, Iu, or any other appropriate way, not excluding explicit signalling over a wireless interface between the serving radio base station 110 and the candidate target network nodes 130-1, 130-2, 130-3.

In case the best candidate target network node 130-1 is identified as a radio base station, according to some embodiments, the user equipment 120 may be handed over to the best candidate target network node 130-1 based on measurements of received signal strength, made by the user equipment 120 on reference signals received by the user equipment 120 from the serving radio base station 110 and the best candidate target network node 130-1, respectively, disregarding any acquired data-rate performance.

Action 603

Data-rate performance over a wireless link between the serving radio base station 110 and the user equipment 120 is acquired.

Acquiring the data-rate performance of the wireless link may comprise any of measuring the data-rate performance of the wireless link between the radio base station 110 and the user equipment 120, or receiving a measurement from the user equipment 120 of the data-rate performance of the wireless link between the radio base station 110 and the user equipment 120.

Further, acquiring the data-rate performance of the wireless link between the serving radio base station 110 and the user equipment 120 may comprise measuring transferred amount of data per time unit in any of the downlink, the uplink, or both the downlink and the uplink.

Thus the acquired data-rate performance may be measured over the wireless link between the radio base station 110 and the user equipment 120 in the downlink and the data-rate performance threshold value may be based on the maximum throughput of the wireless link between the radio base station 110 and the user equipment 120 in the downlink, according to some embodiments.

However, alternatively, the data-rate performance may be measured over the wireless link between the radio base station 110 and the user equipment 120 in the uplink and the data-rate performance threshold value may be based on the maximum throughput of the wireless link between the radio base station 110 and the user equipment 120 in the uplink.

In addition, according to some further embodiments, the data-rate performance may be measured both uplink and downlink of the wireless link between the radio base station 110 and the user equipment 120 and the data-rate performance threshold values may be based on the throughputs of the wireless link between the radio base station 110 and the user equipment 120 in both the uplink and the downlink.

The acquisition of the data-rate performance over the wireless link between the radio base station 110 and the user equipment 120 may comprise receiving a measurement of received signal strength, such as RSRP, or another signal quality related measurement, which may be similar or corresponding, which has been made by the user equipment 120 and transmitted to be received by the radio base station 110.

Action 604

This alternative action may be comprised within some, but not necessarily all embodiments of the method in a radio base station.

A level of load within the cell 115, such as e.g. the fractional load, may be obtained. The level of load within the cell 115 may be obtained by measuring the amount of data transmission within the cell 115 according to some embodiments.

Further, in some embodiments, the cell load may be categorised in different categories, such as for example low, medium and high, depending on the load within the cell 115. Thus in a non-limiting example, if the cell fractional load is below 0.25 the load within the cell 115 may be considered to be low. If the cell fractional load exceeds 0.25 but is lower than 0.45, the load within the cell 115 may be considered to be medium. If cell fractional load exceeds 0.45, the cell load may be considered high.

Action 605

This alternative action may be comprised within some, but not necessarily all embodiments of the method in a radio base station.

The data-rate performance threshold value may be comprised in, and selected from, the set of data-rate performance threshold values, which may further be associated with the level of load within the cell 115 served by the radio base station 110.

However, according to some embodiments, each data-rate performance threshold value may be further associated, in addition to the level of load within the cell 115 served by the radio base station 110, also with an average level of load within the cell 115 served by the radio base station 110 and cells served by the candidate target network nodes 130-1, 130-2, 130-3. Thus, according to those embodiments, the data-rate performance threshold value may be selected from the set of data-rate performance threshold values, which selected data-rate performance threshold value may be further associated with the average level of load within the cell 115 served by the radio base station 110 and the cells served by the candidate target network nodes 130-1, 130-2, 130-3.

Thereby, different levels of load within the cell 115 may render selection of different data-rate performance threshold values, to be selected from the set of data-rate performance threshold values.

A first data-rate performance threshold value may be selected in case a low level of load within the cell 115 has been obtained 604. That first data-rate performance threshold value may be set to 0.5·maximum theoretical bitrate of the wireless link between the serving radio base station 110 and the user equipment 120, according to some embodiments.

Correspondingly, a second data-rate performance threshold value may be selected in case a medium level of load within the cell 115 has been obtained 604. That second data-rate performance threshold value may be set to 0.4·maximum theoretical bitrate of the wireless link between the serving radio base station 110 and the user equipment 120, according to some embodiments.

Further, a third data-rate performance threshold value may be selected in case a high level of load within the cell 115 has been obtained 604. That third data-rate performance threshold value may be set to 0.05·maximum theoretical bitrate of the wireless link between the serving radio base station 110 and the user equipment 120, according to some embodiments.

According to some embodiments, the data-rate performance threshold value may be selected in the following manner, here given as a non-limiting example:

Data-rate performance threshold value in $DL=\beta \cdot \max$ theoretical $DL$ bitrate, Data-rate performance threshold value in $UL=\beta \cdot \max$ theoretical $UL$ bitrate, Where:
$\beta=\min(1-\alpha,\alpha)$ if cell fractional load$<0.5\cdot\alpha$, $\beta=\min(1-\alpha, \alpha)\cdot 0.8$ if $0.5\cdot\alpha \leq$cell fractional load$<0.9\cdot\alpha$, and $\beta=\min(1-\alpha, \alpha)\cdot 0.1$ if cell fractional load$\geq 0.9\cdot\alpha$.

If the resource utilization split between backhaul ($\alpha$) and access ($1-\alpha$) is equal ($\alpha=50\%$ of resources to backhaul link and rest $1-\alpha=50\%$ of the resources to access link), the design of the thresholds may become:

Data-rate performance threshold value in $DL=\beta \cdot \max$ theoretical $DL$ bitrate, Data-rate performance threshold value in $UL=\beta \cdot \max$ theoretical $UL$ bitrate, where $\beta=0.5$ if cell fractional load$<0.25$ (low load area), $\beta=0.4$ if $0.25\leq$cell$\leq$fractional load$<0.45$ (medium load area), and $\beta=0.05$ if cell fractional load$\geq 0.45$ (high load area).

Action 606

The acquired data-rate performance is compared with a data-rate performance threshold value, wherein the data-rate performance threshold value is based on previously determined throughput of a wireless link between at least one user equipment, via a relay node and the radio base station 110 or a neighbouring radio base station 170.

According to some embodiments, the data-rate performance threshold value may have been decided upon beforehand i.e. based on a previously determined throughput over the wireless link.

However, according to some alternative embodiments, the data-rate performance threshold value may be based on the maximum throughput of the wireless link between the radio base station 110 and the user equipment 120, i.e. comprising a portion of the maximum throughput of the wireless link between the radio base station 110 and the user equipment 120. That portion may be a number between 0 and 50% of the maximum throughput of the wireless link between the radio base station 110 and the user equipment 120, according to some embodiments.

The data-rate performance threshold value may according to some embodiments be comprised in a set of data-rate performance threshold values. Further, each data-rate performance threshold value may further be associated with a level of load within a cell 115 served by the radio base station 110, and be selected from the set of data-rate performance threshold values, based on the load within the cell 115, according to some embodiments.

Action 607

It is decided to send handover request of the user equipment 120 to one of the candidate target network nodes 130-1, 130-2, 130-3, if the acquired data-rate performance is lower than the data-rate performance threshold value.

According to some embodiments, it may be decided to send the handover request of the user equipment 120 to said candidate target network node 130-1, 130-2, 130-3, if the acquired 603 data-rate performance is lower than the data-rate performance threshold value and the candidate target network node 130-1, 130-2, 130-3 is identified 602 as a relay station.

It may be decided to send handover request of the user equipment 120 to the best candidate target network node 130-1, if the acquired data-rate performance is lower than the data-rate performance threshold value, according to some embodiments.

Further, if the acquired data-rate performance exceeds the data-rate performance threshold value and all of the candidate target nodes 130-1, 130-2, 130-3 comprised in the list of candidate target network nodes received from the user equipment 120, are identified as relay stations, it may be decided to not send any handover request to any relay candidate target network node 130-1, 130-2, 130-3.

According to some additional alternative embodiments, if the acquired data-rate performance exceeds the data-rate performance threshold value and any of the candidate target network nodes 130-1, 130-2, 130-3 comprised in the list of candidate target network nodes received from the user equipment 120 is identified as a radio base station, it may be decided to send handover request of the user equipment 120 to the candidate target network node 130-1, 130-2, 130-3, identified as a radio base station, from which the user equipment 120 has measured the highest strength of a reference signal among all identified radio base stations comprised in the list of candidate target network nodes 130-1, 130-2, 130-3.

Figure 6B:
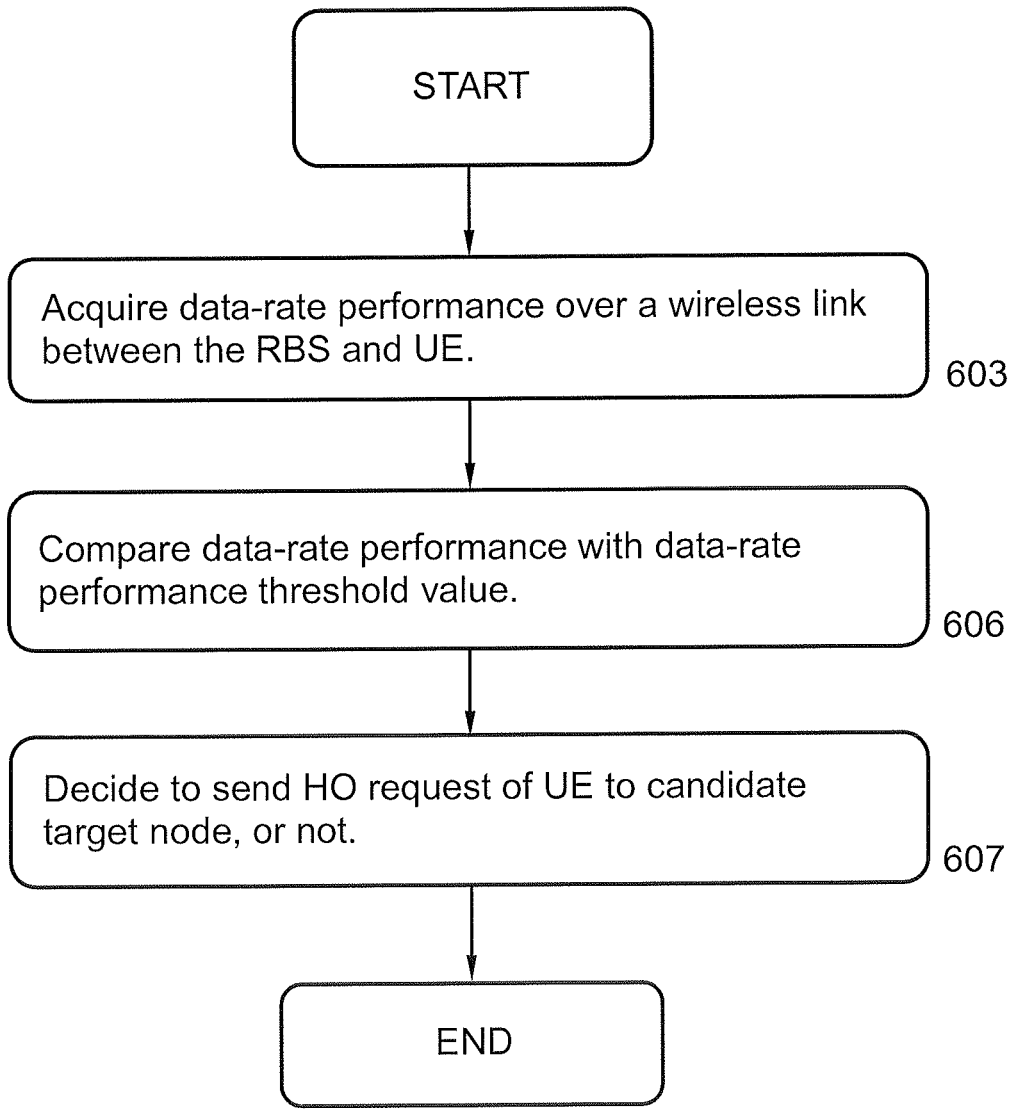
FIG. 6B is a flow chart illustrating examples of actions comprised in alternative embodiments of the present method in a radio base station.

FIG. 6B is a flow chart illustrating embodiments of a method in a radio base station 110. The illustrated embodiment comprises the action 603, 606 and 607, already described under the presentation of FIG. 6A.

Figure 7:
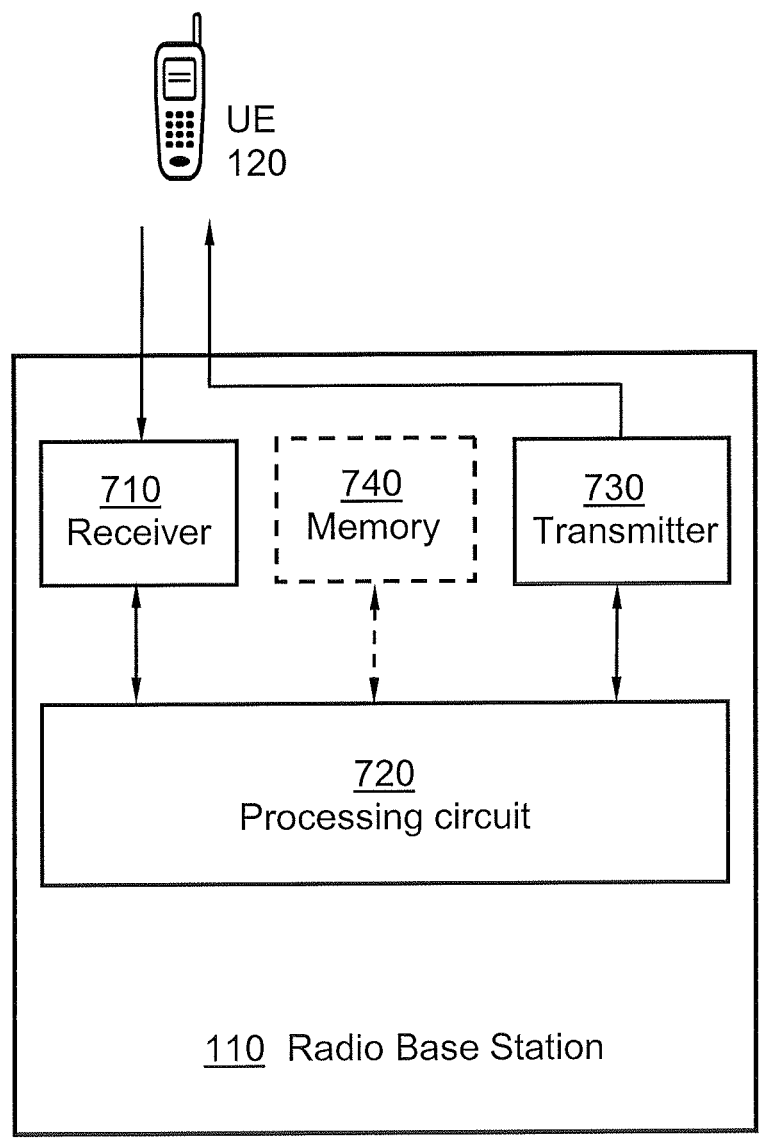
FIG. 7 is a block diagram illustrating an embodiment of a radio base station in a wireless communication system.

FIG. 7 is a block diagram illustrating a radio base station 110, which is serving a user equipment 120. The radio base station 110 is configured to perform any, some or all of the previously described actions 601-607 for deciding if a handover request of the user equipment 120 is to be sent to a candidate target network node.

For the sake of clarity, any internal electronics or other components of the radio base station 110, not completely indispensable for understanding the actions 601-607 comprised in the method has been omitted from FIG. 7.

In order to perform the actions 601-607 correctly, the radio base station 110 comprises a processing circuit 720, configured to acquire data-rate performance over a wireless link between the radio base station 110 and the user equipment 120. The processing circuit 720 is also configured to compare the acquired data-rate performance with a data-rate performance threshold value, wherein the data-rate performance threshold value is based on previously determined throughput of a wireless link between at least one user equipment, via a relay node and the radio base station 110 or a neighbouring radio base station 170. The processing circuit 720 also configured to decide to send the handover request of the user equipment 120 to the candidate target network node 130-1, 130-2, 130-3, if the acquired data-rate performance is lower than the data-rate performance threshold value.

The data-rate performance threshold value may according to some embodiments be comprised in a set of data-rate performance threshold values, wherein each data-rate performance threshold value is further associated with a level of load within a cell 115 served by the radio base station 110.

The processing circuit 720, may further be configured to obtain a level of load within a cell 115 served by the radio base station 110, and to select the data-rate performance threshold value from the set of data-rate performance threshold values, which is further associated with the detected level of load within the cell 115. In addition, the processing circuit 720 may be further configured to identify the candidate target network node 130-1, 130-2, 130-3 as a relay station or a radio base station.

The processing circuit 720, may further be configured to obtain, such as detecting, measuring, or alternatively via a receiver 710, receive a level of load within the cell 115, and to select the data-rate performance threshold value from the set of data-rate performance threshold values, which selected data-rate performance threshold value may be further associated with the obtained level of load within the cell 115.

Each data-rate performance threshold value may further be associated, in addition to the level of load within the cell 115 served by the radio base station 110, also with an average level of load within the cell 115 served by the radio base station 110 and cells served by the candidate target network nodes 130-1, 130-2, 130-3. The processing circuit 720, may according to those embodiments be further configured to select the data-rate performance threshold value from the set of data-rate performance threshold values, which selected data-rate performance threshold value may further be associated with the average level of load within the cell 115 served by the radio base station 110 and the cells served by the candidate target network nodes 130-1, 130-2, 130-3.

The processing circuit 720 may in addition be further configured to acquire data-rate performance of the wireless link either by measuring the data-rate performance of the wireless link between the radio base station 110 and the user equipment 120, or by receiving, via a receiver 710, a measurement from the user equipment 120 of the data-rate performance of the wireless link between the radio base station 110 and the user equipment 120 via a receiver 710, comprised in the radio base station 110.

Also, in addition, the processing circuit 720 may further be configured to acquire data-rate performance of the wireless link between the radio base station 110 and the user equipment 120 by measuring transferred amount of data per time unit in any of the downlink, the uplink, or both the downlink and the uplink.

The processing circuit 720, may further be configured to identify the candidate target network node 130-1, 130-2, 130-3 as a relay station or a radio base station.

Also, the processing circuit 720, may further be configured to identify the candidate target network node 130-1, 130-2, 130-3 as a relay station, and the processing circuit 720, in addition further configured to decide to send the handover request of the user equipment 120 to said candidate target network node 130-1, 130-2, 130-3, if the acquired data-rate performance is lower than the data-rate performance threshold value.

The processing circuit 720, may additionally be further configured to identify the candidate target network node 130-1, 130-2, 130-3 as a relay station, and the processing circuit 720, may further be configured to decide to not send any handover request to any relay candidate target network node 130-1, 130-2, 130-3, if the acquired data-rate performance exceeds the data-rate performance threshold value and all of the candidate target network nodes 130-1, 130-2, 130-3 comprised in the received list of candidate target network nodes 130-1, 130-2, 130-3, are identified as relay stations.

The processing circuit 720 may comprise e.g. one or more instances of a Central Processing Unit (CPU), a processing unit, a processor, a microprocessor, means for processing data, or other processing logic that may interpret and execute instructions. The processing circuit 720 may further perform data processing functions for inputting, outputting, and processing of data comprising data buffering and device control functions, such as call processing control, user interface control, or the like.

Further yet, embodiments of the radio base station 110 in addition may comprise a receiver 710, configured to receive a list of candidate target network nodes 130-1, 130-2, 130-3 from the user equipment 120, which list is based on measurements of received signal strength, made by the user equipment 120 on reference signals received by the user equipment 120 from each respective candidate target network nodes 130-1, 130-2, 130-3. Thus, the receiver 710 may be configured to receive a measurement of received signal strength from the user equipment 120, according to some embodiments.

In addition, the radio base station 110 may comprise a transmitter 730 according to some embodiments. The transmitter 730 may be arranged to transmit wireless signals to the user equipment 120, and/or the candidate target network nodes 130-1, 130-2, 130-3. The transmitter 730 may according to some embodiments be configured to transmit an instruction to be received by the user equipment 120, instructing the user equipment 120 to not report any signal strength measurements, if they are smaller than a threshold value.

According to some embodiments, the radio base station 110 may comprise at least one memory 740. The memory 740 may comprise a physical device utilized to store data or programs i.e. sequences of instructions, on a temporary or permanent basis. According to some embodiments, the memory 740 may comprise integrated circuits comprising silicon-based transistors. Further, the memory 740 may be volatile, non-volatile or comprise some units which are volatile and some units which are non-volatile.

Further, it is to be noted that some of the described units 710-740 comprised within the radio base station 110 in the wireless communication system 100 are to be regarded as separate logical entities but not with necessity separate physical entities. To mention just one example, the receiver 710 and the transmitter 730 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the radio base station 110, the candidate target network nodes 130-1, 130-2, 130-3 and the user equipment 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other network node comprised in the wireless communication system 100.

The actions 601-607 to be performed in the radio base station 110 may be implemented through one or more processing circuits 720 in the radio base station 110, together with computer program code for performing the functions of the present actions 601-607. Thus a computer program product, comprising instructions for performing the actions 601-607 in the radio base station 110 may decide if a handover request of the user equipment 120 is to be sent to a candidate target network node 130-1, 130-2, or 130-3, when being loaded into the one or more processing circuits 720.

The computer program product mentioned above may be provided for instance in the form of a data carrier carrying computer program code for performing at least some of the actions 601-607 according to some embodiments when being loaded into the processing circuit 720. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the radio base station 110 remotely, e.g. over an Internet or an intranet connection.

Figure 8A:
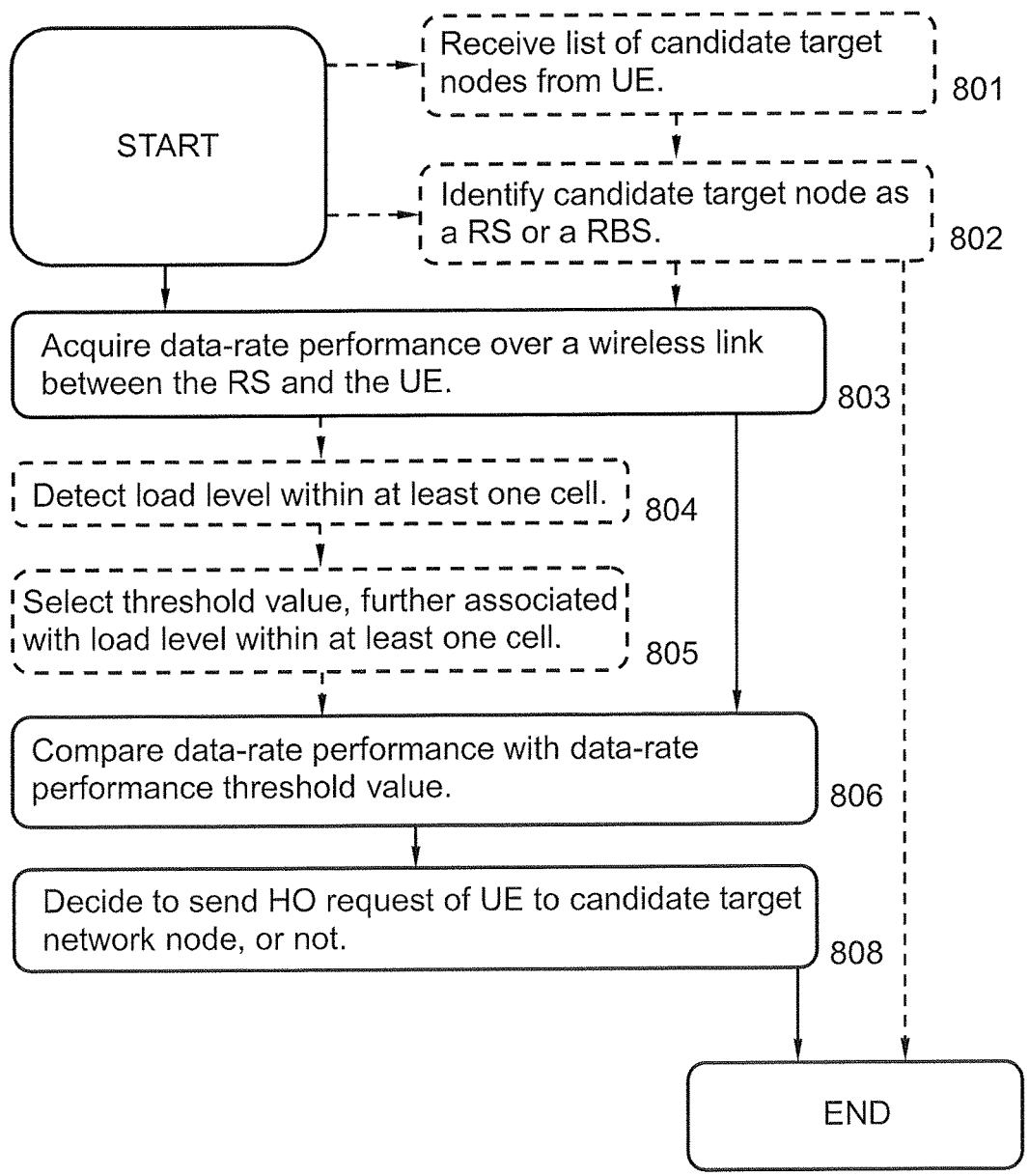
FIG. 8A is a flow chart illustrating examples of actions comprised in embodiments of the method in a relay station.

FIG. 8A is a flow chart illustrating embodiments of a method in a relay station 112. The relay station 112 is serving a user equipment 120. The method aims at deciding if a handover request of the user equipment 120 is to be sent to a candidate target network node 130-1, 130-2, or 130-3.

The serving relay station 112, the user equipment 120 and the candidate target network nodes 130-1, 130-2, 130-3 are configured for wireless communication with each other. The relay station 112 and the candidate target network nodes 130-1, 130-2, 130-3 are comprised in a wireless communication system 100, which is a heterogeneous network comprising network nodes with differently sized transmission power capacity. Any, some or all of the candidate target network nodes 130-1, 130-2, 130-3 may comprise a radio base station, such as an Evolved Node B, a macro base station, a micro base station or a pico base station. Further, any, some or all of the candidate target network node 130-1, 130-2, 130-3 may comprise a relay station, configured to operate in half-duplex communication mode, and to operate with a donor radio base station over a backhaul link in half-duplex communication mode. Any of the candidate target network nodes 130-1, 130-2, 130-3, which comprises a radio base station, may according to some embodiments be donor base station in relation to the serving relay station 112. However, the relay station 112 may have another donor base station according to some embodiments.

The wireless communication system 100 may be based on Long-Term Evolution (LTE) within the Third Generation Partnership Project (3GPP) according to some embodiments.

The method, according to some embodiments, may be performed only if the user equipment 120 is in active mode. Thereby, it is avoided to make handover of user equipment 120 which anyway is not in active state and thus neither take advantage of the improved performance enabled by the present method in a relay station, nor contribute to any interference.

To appropriately decide if a handover request of the user equipment 120 is to be sent to the candidate target network node 130-1, 130-2, or 130-3, the method may comprise a number of actions 801-808.

It is however to be noted that some of the described actions, e.g. action 801-803 may be performed in a somewhat different chronological order than the enumeration indicates. Also, it is to be noted that some of the actions such as e.g. 801-802 and/or 804-805 may be performed within some alternative embodiments. Further any, some or all actions, such as for example e.g. 801, 802 and/or 803 may be performed simultaneously or in a rearranged chronological order. The method may comprise the following actions:

Action 801

This alternative action may be comprised within some, but not necessarily all embodiments of the method in a relay station.

A list of candidate target network nodes 130-1, 130-2, 130-3 may be received from the user equipment 120, which list may be based on measurements of received signal strength, made by the user equipment 120 on reference signals received by the user equipment 120 from each respective candidate target network node 130-1, 130-2, 130-3.

Such measurement of received signal strength may comprise a RSRP measurement according to some embodiments, or any other appropriate measurement to signal strength and/or signal quality.

The list of candidate target network nodes 130-1, 130-2, 130-3 may be predetermined to comprise a certain number of candidates such as e.g. the three candidate target network nodes 130-1, 130-2, 130-3 from which the highest signal strength of a reference signal has been received, according to some embodiments. Note that three is merely an example of an appropriate number of candidate target network nodes 130-1, 130-2, 130-3 to be comprised in the list of candidate target network nodes 130-1, 130-2, 130-3. Other appropriate number may comprise 1, 2, 4, 5 or any appropriate multiple of any of these numbers. According to other embodiments, only candidate target network nodes 130-1, 130-2, 130-3 from which the user equipment 120 has received signal strength above a threshold value may be comprised in the list. Thereby the inclusion of candidate target network nodes 130-1, 130-2, 130-3 which anyway have too low received signal strength to be considered as successful candidate target network nodes 130-1, 130-2, 130-3 in a handover scenario concerning the user equipment 120, may be omitted. Thereby less data may be transmitted in the uplink from the user equipment 120 to the relay station 112, which may save radio resources.

Further, by configuring the user equipment 120 to only provide a list of candidate target network nodes 130-1, 130-2, 130-3 when the received signal power is above a threshold value, battery power of the user equipment 120 may be saved, thereby prolonging the operational time of the user equipment 120.

Action 802

This alternative action may be comprised within some, but not necessarily all embodiments of the method in a relay station.

The candidate target network nodes 130-1, 130-2, 130-3 may be identified as a relay station or a radio base station.

Such identification may comprise for example information exchange, such as requests, and/or reports made for example over an intra-network node communication interface, such as e.g. X2, Alda, Iub, Iur, Iu, or any other appropriate way, not excluding explicit signalling over a wired, or wireless, interface between the serving relay station 112 and the candidate target network nodes 130-1, 130-2, 130-3.

In case the best candidate target network node 130-1 is identified as a radio base station, according to some embodiments, the user equipment 120 may be handed over to the best candidate target network node 130-1 based on measurements of received signal strength, made by the user equipment 120 on reference signals received by the user equipment 120 from the serving relay station 112 and the best candidate target network node 130-1, respectively, disregarding any acquired data-rate performance.

Action 803

Data-rate performance over a wireless link between the serving relay station 112 and the user equipment 120 is acquired.

Acquiring the data-rate performance of the wireless link may comprise any of measuring the data-rate performance of the wireless link between the relay station 112 and the user equipment 120, or receiving a measurement from the user equipment 120 of the data-rate performance of the wireless link between the relay station 112 and the user equipment 120 according to some embodiments.

However, the data-rate performance of the wireless link between the relay station 112 and the user equipment 120 may be acquired by measuring transferred amount of data per time unit in any of the downlink, the uplink, or both the downlink and the uplink.

Thereby the acquired data-rate performance may be measured over the wireless link between the relay station 112 and the user equipment 120 in the downlink and the data-rate performance threshold value may be based on the maximum throughput of the wireless link between the relay station 112 and the user equipment 120 in the downlink, according to some embodiments.

However, alternatively, the data-rate performance may be measured over the wireless link between the relay station 112 and the user equipment 120 in the uplink and the data-rate performance threshold value may be based on the maximum throughput of the wireless link between the relay station 112 and the user equipment 120 in the uplink.

In addition, according to some further embodiments, the data-rate performance may be measured both uplink and downlink of the wireless link between the relay station 112 and the user equipment 120 and the data-rate performance threshold values may be based on the throughputs of the wireless link between the relay station 112 and the user equipment 120 in both the uplink and the downlink.

The acquisition of the data-rate performance over the wireless link between the relay station 112 and the user equipment 120 may comprise, receiving a measurement of received signal strength, such as RSRP, or another signal quality related measurement, which may be similar or corresponding, which has been made by the user equipment 120 and transmitted to be received by the relay station 112.

Further, according to some alternative embodiments, the acquired data-rate performance may be compared with an extra handover threshold value. The extra handover threshold value may be set to a fraction of maximum throughput of the relay station 112. The extra handover threshold value may be predetermined, or configurable according to different embodiments. Further, the extra handover threshold value may be set to the same value as, or different value from, the previously discussed data-rate performance threshold value, according to different embodiments.

In case the acquired data-rate performance exceeds the extra handover threshold value, which may be set to a fraction of maximum throughput of the relay station 112, the user equipment 120 may be triggered to measure the strength of received reference signals from further candidate target network nodes 140-1, 140-2, according to some embodiments.

Further, the user equipment 120 may be triggered to measure the strength of received reference signals from further candidate target network nodes 140-1, 140-2 if the acquired data-rate performance in the downlink exceeds the extra handover threshold value, which may be set to a fraction of maximum downlink throughput of the relay station 112, according to some embodiments.

However, according to some embodiments, the user equipment 120 may be triggered to measure the strength of received reference signals from further candidate target network nodes 140-1, 140-2 if the acquired data-rate performance in the uplink exceeds the extra handover threshold value, which may be set to a fraction of maximum uplink throughput of the relay station 112.

Further, according to some embodiments, the user equipment 120 may be triggered to measure the strength of received reference signals from further candidate target network nodes 140-1, 140-2 if the acquired data-rate performances in both the uplink and the downlink exceed the UL and DL extra handover threshold values, which may be set to a fraction of maximum uplink throughput and downlink throughput, respectively, of the relay station 112.

Additionally, according to yet some embodiments, another prerequisite for triggering the user equipment 120 to measure the strength of received reference signals from further candidate target network nodes 140-1, 140-2 may be that there have not been received, or reported to the relay station 112, any reference signals from any closer candidate target network nodes 130-1, 130-2, 130-3 which are identified as radio base stations, above a certain threshold value.

Action 804

This alternative action may be comprised within some, but not necessarily all embodiments of the method in a relay station.

A level of load within the cell 117, such as e.g. the fractional load, may be detected. The level of load within the cell 117 may be detected by measuring the amount of data transmission within the cell 117.

However, according to some embodiments, each data-rate performance threshold value may be further associated, in addition to the level of load within the cell 117 served by the relay station 112, also with an average level of load within the cell 117 served by the relay station 112 and cells served by the candidate target network nodes 130-1, 130-2, 130-3.

Further, in some embodiments, the cell load may be categorised in different categories, such as for example low, medium and high, depending on the load within the cell 117. Thus in a non-limiting example, if the cell fractional load is below 0.25 the load within the cell 117 may be considered to be low. If the cell fractional load exceeds 0.25 but is lower than 0.45, the load within the cell 117 may be considered to be medium. If cell fractional load exceeds 0.45, the cell load may be considered high.

Action 805

This alternative action may be comprised within some, but not necessarily all embodiments of the method in a relay station.

The data-rate performance threshold value may be selected from the set of data-rate performance threshold values, which selected data-rate performance threshold value may further be associated with the detected level of load within the cell 117.

Thereby, different levels of load within the cell 117 may render selection of different data-rate performance threshold values, to be selected from the set of data-rate performance threshold values.

However, in embodiments wherein data-rate performance threshold value is further associated with an average level of load within the cell 117 served by the relay station 112 and cells served by the candidate target network nodes 130-1, 130-2, 130-3, the data-rate performance threshold value may be selected from the set of data-rate performance threshold values, which selected data-rate performance threshold value may be further associated with the average level of load within the cell 117 served by the relay station 112 and the cells served by the candidate target network nodes 130-1, 130-2, 130-3.

A first data-rate performance threshold value may be selected in case a low level of load within the cell 117 has been obtained 804. That first data-rate performance threshold value may be set to 0.5·maximum theoretical bitrate of the wireless link between the donor radio base station of the serving relay station 112 and the user equipment 120, according to some embodiments.

Correspondingly, a second data-rate performance threshold value may be selected in case a medium level of load within the cell 117 has been obtained 804. That second data-rate performance threshold value may be set to 0.4·maximum theoretical bitrate of the wireless link between the donor radio base station of the serving relay station 112 and the user equipment 120, according to some embodiments.

Further, a third data-rate performance threshold value may be selected in case a high level of load within the cell 117 has been obtained 804. That third data-rate performance threshold value may be set to 0.05·maximum theoretical bitrate of the wireless link between the donor radio base station of the serving relay station 112 and the user equipment 120, according to some embodiments.

According to some embodiments, the data-rate performance threshold value may be selected in the following manner, here given as a non-limiting example:

Data-rate performance threshold value in $DL=\beta \cdot$max theoretical $DL$ bitrate, Data-rate performance threshold value in $UL=\beta \cdot$max theoretical $UL$ bitrate, where:
$\beta=\min(1-\alpha,\alpha)$ if cell fractional load$<0.5 \cdot \alpha$, $\beta=\min(1-\alpha, \alpha) \cdot 0.8$ if $0.5 \cdot \alpha \leq$cell fractional load$<0.9 \cdot \alpha$, and $\beta=\min(1-\alpha, \alpha) \cdot 0.1$ if cell fractional load$\geq 0.9 \cdot \alpha$.

If the resource utilization split between backhaul ($\alpha$) and access ($1-\alpha$) is equal ($\alpha=50\%$ of resources to backhaul link and rest $1-\alpha=50\%$ of the resources to access link), the design of the thresholds may become:

Data-rate performance threshold value in $DL=\beta \cdot$max theoretical $DL$ bitrate, Data-rate performance threshold value in $UL=\beta \cdot$max theoretical $UL$ bitrate, where $\beta=0.5$ if cell fractional load$<0.25$ (low load area), $\beta=0.4$ if $0.25\leq$cell$\leq$fractional load$<0.45$ (medium load area), and $\beta=0.05$ if cell fractional load$\geq 0.45$ (high load area).

Action 806

The acquired data-rate performance is compared with a data-rate performance threshold value, wherein the data-rate performance threshold value is based on previously determined throughput of a wireless link between at least one user equipment, via a relay node and a radio base station 110 or a neighbouring radio base station 170.

The data-rate performance threshold value may according to some embodiments be comprised in a set of data-rate performance threshold values, wherein each data-rate performance threshold value may be further associated with a level of load within a cell 117 served by the relay station 112.

Action 807

This alternative action may be comprised within some, but not necessarily all embodiments of the method.

If none of the candidate target node 130-1, 130-2, 130-3 is identified 802 as a radio base station, the user equipment 120 may be requested to measure the strength of a reference signal received by the user equipment 120 from further candidate target nodes 130-1, 130-2, 130-3, 140-1, 140-2, and to report the result of the measurement to the relay station 112.

Requesting the user equipment 120 to measure the strength of a reference signal received by the user equipment 120 from further candidate target nodes 130-1, 130-2, 130-3, 140-1, 140-2, and to report the result of the measurement to the relay station 112 further comprises determining and transmitting a signal strength delta value, to be received by the user equipment 120.

The user equipment 120 may be requested to measure the strength of received reference signals from candidate target nodes 130-1, 130-2, 130-3, 140-1, 140-2 if the acquired 803 data-rate performance exceeds the data-rate performance threshold value, which may be set to a fraction of the maximum throughput of the relay station 112.

However, the user equipment 120 may be triggered to measure the strength of a reference signal received by the user equipment 120 from further candidate target network nodes 140-1, 140-2, only in case none of the previously received candidate target network nodes 130-1, 130-2, 130-3 comprises a radio base station, according to some embodiments.

Action 808

It is decided to send the handover request of the user equipment 120 to one of the candidate target network nodes 130-1, 130-2, 130-3, if the acquired data-rate performance is lower than the data-rate performance threshold value.

According to some embodiments, it may however be decided to send the handover request of the user equipment 120 to the candidate target network node 130-1, 130-2, 130-3, disregarding any acquired 803 data-rate performance, in case the candidate target network node 130-1, 130-2, 130-3 is identified 802 as a radio base station.

Further, if the candidate target network node 130-1, 130-2, 130-3 is identified 802 as a relay station, it may be decided 808 to send the handover request of the user equipment 120 to the candidate target network node 130-1, 130-2, 130-3, if the acquired 803 data-rate performance is lower than the data-rate performance threshold value.

It may in some embodiments be decided to not send any handover request to any relay candidate target network node 130-1, 130-2, 130-3, if the acquired 803 data-rate performance exceeds the data-rate performance threshold value and all of the candidate target network nodes 130-1, 130-2, 130-3 comprised in the received 801 list of candidate target network nodes 130-1, 130-2, 130-3, are identified 802 as relay stations It may be decided, according to some embodiments to send the handover request of the user equipment 120 to any of the further candidate target nodes 130-1, 130-2, 130-3, 140-1, 140-2, which has been identified 802 as a radio base station.

It may be decided to send handover request of the user equipment 120 to the best candidate target network node 130-1, if the acquired data-rate performance is lower than the data-rate performance threshold value, according to some embodiments.

Further, if the acquired data-rate performance exceeds the data-rate performance threshold value and all of the candidate target nodes 130-1, 130-2, 130-3 comprised in the list of candidate target network nodes received from the user equipment 120, are identified as relay stations, it may be decided to not send any handover request to any relay candidate target network node 130-1, 130-2, 130-3.

According to some additional alternative embodiments, if the acquired data-rate performance exceeds the data-rate performance threshold value and any of the candidate target network nodes 130-1, 130-2, 130-3 comprised in the list of candidate target network nodes received from the user equipment 120 is identified as a radio base station, it may be decided to send handover request of the user equipment 120 to the candidate target network node 130-1, 130-2, 130-3, identified as a radio base station, from which the user equipment 120 has measured the highest strength of a reference signal among all radio base stations comprised in the list of candidate target network nodes 130-1, 130-2, 130-3.

This action may further comprise computing and transmitting a signal strength delta value, to be received by the user equipment 120, according to some embodiments.

It may be decided to send handover request of the user equipment 120 to any of the further candidate target network nodes 140-1, 140-2, which is identified as a radio base station. Further, according to some embodiments, it may be determined to send the handover request of the user equipment 120 to the further candidate target network nodes 140-1, 140-2 from which the user equipment 120 has measured the highest strength of a reference signal among all radio base stations comprised in the list of further candidate target network nodes 140-1, 140-2, in case there are more than one further candidate target network nodes 140-1, 140-2 comprising a radio base station.

Figure 8B:
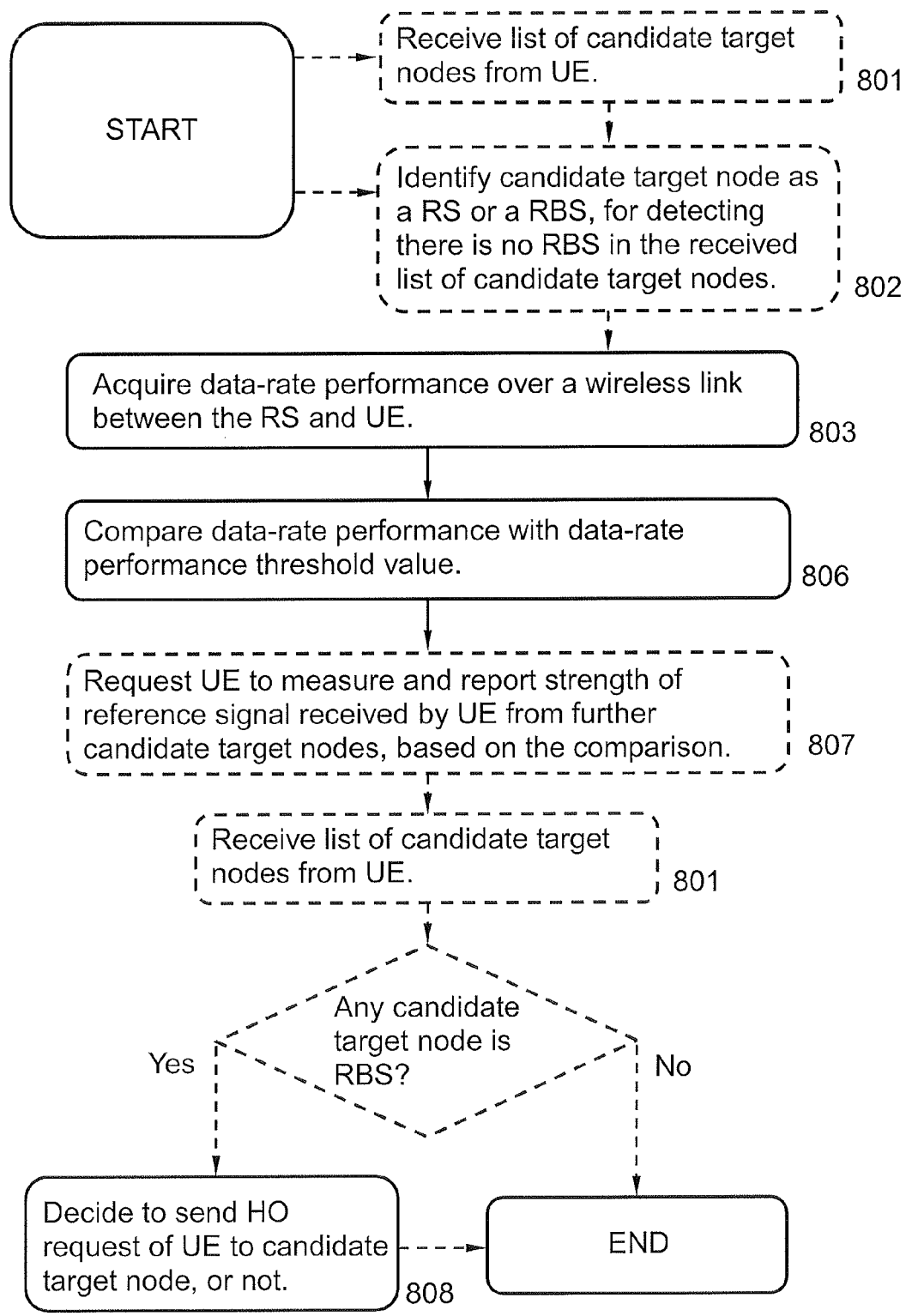
FIG. 8B is a flow chart illustrating examples of actions comprised in alternative embodiments of the method in a relay station.

FIG. 8B is a flow chart illustrating embodiments of an alternative method in a relay station. The illustrated embodiment may comprise any of the actions 801-808, already described under the presentation of FIG. 8A.

In the method embodiment depicted in FIG. 8B is in particular illustrated the case in which all candidate target network nodes 130-1, 130-2, 130-3, reported by the user equipment 120 in the list of candidate target network nodes, are identified 802 by the serving relay station 112, as relay stations. It may in such case be considered to not make any handover to any of these candidate target network nodes 130-1, 130-2, 130-3.

However, the user equipment 120 may in such case be requested to measure the strength of a reference signal received by the user equipment 120 from further candidate target nodes 130-1, 130-2, 130-3, 140-1, 140-2, and to report the result of the measurement to the relay station 112.

Such request may comprise determining and transmitting a signal strength delta value, to be received by the user equipment 120.

Thereby may the user equipment 120 be triggered to search for further candidate target nodes 140-1, 140-2, i.e. candidate target nodes from which a weaker signal has been received by the user equipment 120, than from the previously reported candidate target nodes 130-1, 130-2, 130-3. The reason is that thanks to the delta value added by the serving relay station 112 in some embodiments, the user equipment 120 is made to believe that the signal received from the serving relay station 112 is weaker than it in reality is. Thereby is the user equipment 120 triggered to report also further candidate target nodes 140-1, 140-2 from which a weak signal, such as RSRP has been received.

Upon receiving the list of further candidate target nodes 130-1, 130-2, 130-3, 140-1, 140-2 from the user equipment 120, the serving relay station 112 may identify if any of the of further candidate target nodes 130-1, 130-2, 130-3, 140-1, 140-2 in the list is a radio base station.

Thus, it may be decided to send handover request of the user equipment 120 to any of the further candidate target network nodes 140-1, 140-2, which is identified as a radio base station. Further, according to some embodiments, it may be determined to send the handover request of the user equipment 120 to the further candidate target network nodes 140-1, 140-2 from which the user equipment 120 has measured the highest strength of a reference signal among all radio base stations comprised in the list of further candidate target network nodes 140-1, 140-2, in case there are more than one further candidate target network nodes 140-1, 140-2 comprising a radio base station.

Figure 8C:
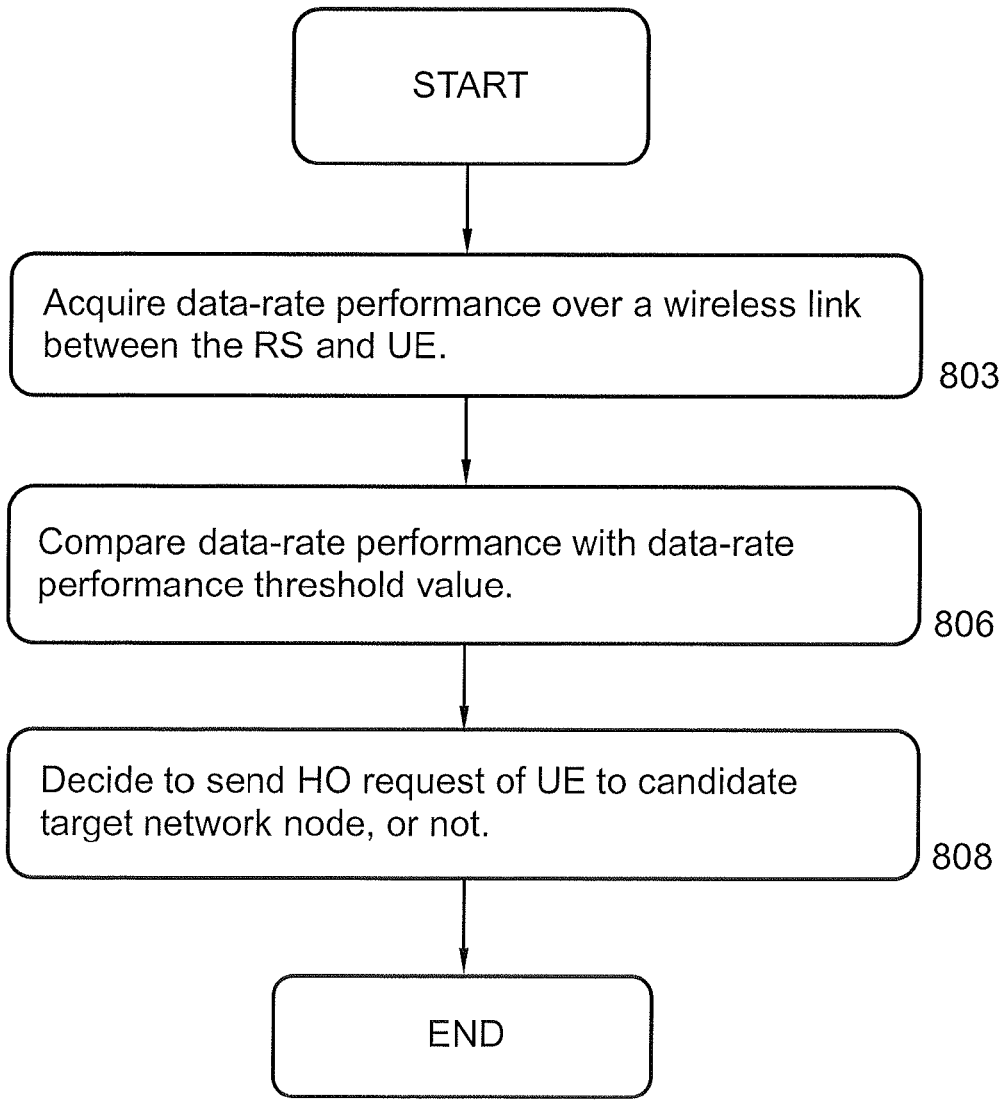
FIG. 8C is a flow chart illustrating examples of actions comprised in alternative embodiments of the method in a relay station.

FIG. 8C is a flow chart illustrating embodiments of a method in a serving relay station. The illustrated embodiment comprises the action 803, 806 and 808, already described under the presentation of FIG. 8A and FIG. 8B.

Figure 9:
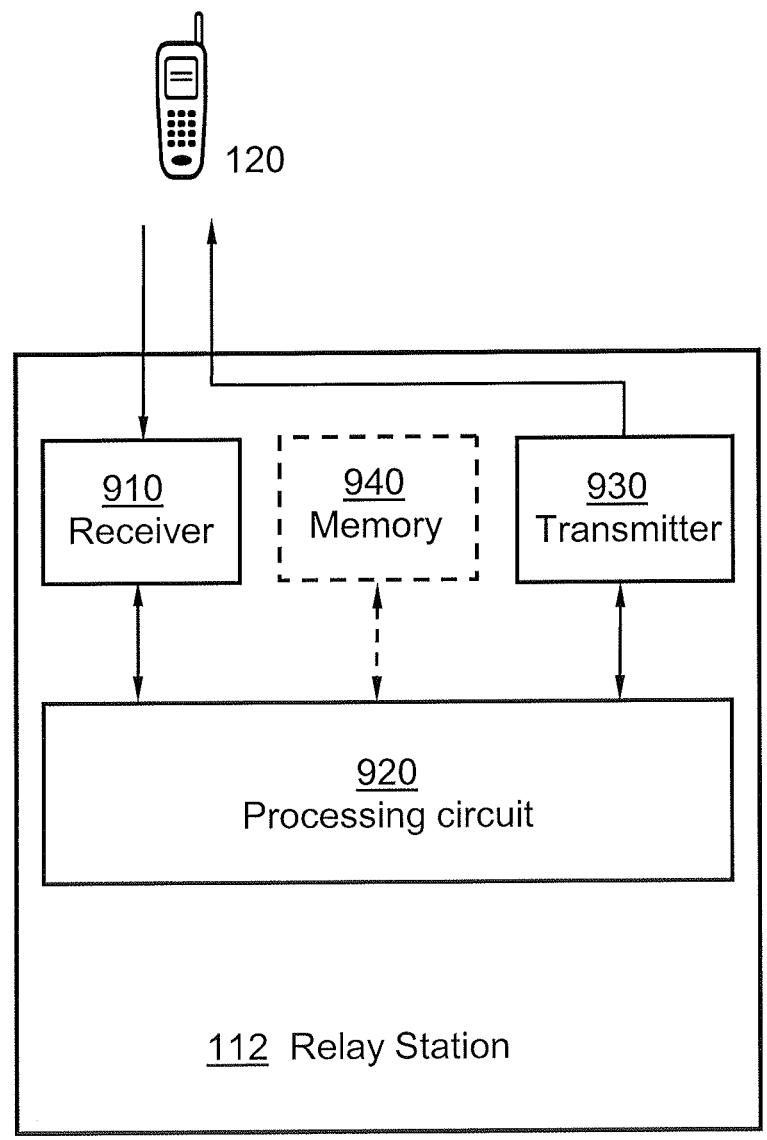
FIG. 9 is a block diagram illustrating an embodiment of a relay station in a wireless communication system.

FIG. 9 is a block diagram illustrating a relay station 112, which is serving a user equipment 120. The serving relay station 112 is configured to perform any, some or all of the actions 801-808 for deciding if a handover request of the user equipment 120 is to be sent to a candidate target network node.

For the sake of clarity, any internal electronics or other components of the relay station 112, not completely indispensable for understanding the present method has been omitted from FIG. 9.

In order to perform the actions 801-808 correctly, the relay station 112 comprises a processing circuit 920, configured to acquire data-rate performance over a wireless link between the relay station 112 and the user equipment 120. The processing circuit 920 is also configured to compare the acquired data-rate performance with a data-rate performance threshold value, wherein the data-rate performance threshold value is based on previously determined throughput of a wireless link between at least one user equipment, via a relay node and a donor radio base station or a neighbouring radio base station 170. The processing circuit 920 is also configured to decide to send the handover request of the user equipment 120 to the candidate target network node 130-1, 130-2, 130-3, if the acquired data-rate performance is lower than the data-rate performance threshold value.

The data-rate performance threshold value may according to some embodiments be comprised in a set of data-rate performance threshold values, wherein each data-rate performance threshold value is further associated with a level of load within a cell 117 served by the relay station 112.

The processing circuit 920, may further be configured to obtain a level of load within a cell 117 served by the relay station 112, and to select the data-rate performance threshold value from the set of data-rate performance threshold values, which may further be associated with the detected level of load within the cell 117. In addition, the processing circuit 920 may be further configured to identify the candidate target network node 130-1, 130-2, 130-3 as a relay station or a radio base station.

The processing circuit 920, may further be configured to obtain, such as detecting, measuring, or alternatively via a receiver 910, receive a level of load within the cell 117, and to select the data-rate performance threshold value from the set of data-rate performance threshold values, which selected data-rate performance threshold value may be further associated with the obtained level of load within the cell 117.

Each data-rate performance threshold value may further be associated, in addition to the level of load within the cell 117 served by the relay station 112, also with an average level of load within the cell 117 served by the relay station 112 and cells served by the candidate target network nodes 130-1, 130-2, 130-3. The processing circuit 920, may according to those embodiments be further configured to select the data-rate performance threshold value from the set of data-rate performance threshold values, which selected data-rate performance threshold value may further be associated with the average level of load within the cell 117 served by the relay station 112 and the cells served by the candidate target network nodes 130-1, 130-2, 130-3.

The processing circuit 920 may in addition be further configured to acquire data-rate performance of the wireless link either by measuring the data-rate performance of the wireless link between the relay station 112 and the user equipment 120, or by receiving, via a receiver 910, a measurement from the user equipment 120 of the data-rate performance of the wireless link between the relay station 112 and the user equipment 120 via a receiver 910, comprised in the relay station 112.

Also, in addition, the processing circuit 920 may further be configured to acquire data-rate performance of the wireless link between the relay station 112 and the user equipment 120 by measuring transferred amount of data per time unit in any of the downlink, the uplink, or both the downlink and the uplink.

The processing circuit 920, may further be configured to identify the candidate target network node 130-1, 130-2, 130-3 as a relay station or a radio base station.

Also, the processing circuit 920, may further be configured to identify the candidate target network node 130-1, 130-2, 130-3 as a relay station, and the processing circuit 920, in addition further configured to decide to send the handover request of the user equipment 120 to said candidate target network node 130-1, 130-2, 130-3, if the acquired data-rate performance is lower than the data-rate performance threshold value.

The processing circuit 920, may additionally be further configured to identify the candidate target network node 130-1, 130-2, 130-3 as a relay station, and the processing circuit 920, may further be configured to decide to not send any handover request to any relay candidate target network node 130-1, 130-2, 130-3, if the acquired data-rate performance exceeds the data-rate performance threshold value and all of the candidate target network nodes 130-1, 130-2, 130-3 comprised in the received list of candidate target network nodes 130-1, 130-2, 130-3, are identified as relay stations.

The processing circuit 920 may alternatively be further configured to decide to send the handover request of the user equipment 120 to the candidate target network node 130-1, 130-2, 130-3, disregarding any acquired data-rate performance, if the candidate target network node 130-1, 130-2, 130-3 is identified as a radio base station.

Also, the processing circuit 920 may be further configured to determine and transmit a signal strength delta value, to be received by the user equipment 120 according to some embodiments.

The processing circuit 920 may further be configured to determine to request the user equipment 120 to measure the strength of received reference signals from candidate target nodes 130-1, 130-2, 130-3, 140-1, 140-2, in case the acquired data-rate performance exceeds the extra handover threshold value, which may be set to a fraction of the maximum throughput of the relay station 112 and associated with the triggering of an extra handover.

Also, the processing circuit 920 may in further addition be configured to decide to send the handover request of the user equipment 120 to any of the further candidate target network nodes 140-1, 140-2, which is identified as a radio base station.

The processing circuit 920 may comprise e.g. one or more instances of a Central Processing Unit (CPU), a processing unit, a processor, a microprocessor, means for processing data, or other processing logic that may interpret and execute instructions. The processing circuit 920 may further perform data processing functions for inputting, outputting, and processing of data comprising data buffering and device control functions, such as call processing control, user interface control, or the like.

Further yet, embodiments of the relay station 112 in addition may comprise a receiver 910, configured to receive a list of candidate target network nodes 130-1, 130-2, 130-3 from the user equipment 120, which list is based on measurements of received signal strength, made by the user equipment 120 on reference signals received by the user equipment 120 from each respective candidate target network nodes 130-1, 130-2, 130-3. Thus, the receiver 910 may be configured to receive a measurement of received signal strength from the user equipment 120, according to some embodiments.

In addition, the relay station 112 may comprise a transmitter 930 according to some embodiments. The transmitter 930 may be arranged to transmit wireless signals to the user equipment 120, and/or the candidate target network nodes 130-1, 130-2, 130-3. The transmitter 930 may according to some embodiments be configured to transmit an instruction to be received by the user equipment 120, instructing the user equipment 120 to not report any signal strength measurements, if they are smaller than a threshold value.

Further, the transmitter 930 may be configured to transmit a request to the user equipment 120 to measure the strength of a reference signal received by the user equipment 120 from further candidate target nodes 130-1, 130-2, 130-3, 140-1, 140-2, and to report the result of the measurement to the relay station 112.

According to some embodiments, the relay station 112 may comprise at least one memory 940. The memory 940 may comprise a physical device utilized to store data or programs i.e. sequences of instructions, on a temporary or permanent basis. According to some embodiments, the memory 940 may comprise integrated circuits comprising silicon-based transistors. Further, the memory 940 may be volatile, non-volatile or comprise some units which are volatile and some units which are non-volatile.

Further, it is to be noted that some of the described units 910-940 comprised within the relay station 112 in the wireless communication system 100 are to be regarded as separate logical entities but not with necessity separate physical entities. To mention just one example, the receiver 910 and the transmitter 930 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the relay station 112, the candidate target network nodes 130-1, 130-2, 130-3 and the user equipment 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other network node comprised in the wireless communication system 100.

The actions 801-808 to be performed in the relay station 112 may be implemented through one or more processing circuits 920 in the relay station 112, together with computer program code for performing the functions of the present actions 801-808. Thus a computer program product, comprising instructions for performing the actions 801-808 in the relay station 112 may decide if a handover request of the user equipment 120 is to be sent to a candidate target network node 130-1, 130-2, or 130-3, when being loaded into the one or more processing circuits 920.

The computer program product mentioned above may be provided for instance in the form of a data carrier carrying computer program code for performing at least some of the actions 801-808 according to some embodiments when being loaded into the processing circuit 920. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the relay station 112 remotely, e.g. over an Internet or an intranet connection.

When using the formulation "comprise" or "comprising" within the present context, it is to be interpreted as non-limiting, i.e. meaning "consist at least of". The present methods and devices are not limited to the above described preferred embodiments. Various alternatives, modifications and equivalents may be used. Therefore, the above embodiments are not to be taken as limiting the scope of claimed protection, which instead is to be defined by the appending claims.

The invention claimed is:

1. A method, in a radio base station serving a user equipment, for deciding whether a handover request of the user equipment is to be sent to a candidate target network node, the method comprising:
   acquiring data-rate performance of a wireless link between the radio base station and the user equipment;
   comparing the acquired data-rate performance with a data-rate performance threshold value, wherein the data-rate performance threshold value is based on a previously determined throughput of a wireless link between at least one user equipment, via a relay node, and the radio base station or a neighboring radio base station; and
   deciding to send the handover request of the user equipment to the candidate target network node, in the event that the acquired data-rate performance is lower than the data-rate performance threshold value.

2. The method of claim 1, wherein the data-rate performance threshold value is part of a set of data-rate performance threshold values, and wherein each data-rate performance threshold value is further associated with a level of load within a cell served by the radio base station, the method further comprising:
   obtaining a level of load within the cell; and
   selecting the data-rate performance threshold value from the set of data-rate performance threshold values, which selected data-rate performance threshold value is further associated with the obtained level of load within the cell.

3. The method of claim 2, wherein each data-rate performance threshold value is further associated, in addition to the level of load within the cell served by the radio base station, also with an average level of load within the cell served by the radio base station and cells served by the candidate target network nodes, and wherein the data-rate performance threshold value is selected from the set of data-rate performance threshold values, which selected data-rate performance threshold value is further associated with the average level of load within the cell served by the radio base station and the cells served by the candidate target network nodes.

4. The method of claim 1, wherein acquiring data-rate performance of the wireless link comprises any of measuring the data-rate performance of the wireless link between the radio base station and the user equipment or receiving a measurement from the user equipment of the data-rate performance of the wireless link between the radio base station and the user equipment.

5. The method of claim 1, wherein acquiring data-rate performance of the wireless link between the radio base station and the user equipment comprises measuring transferred amount of data per time unit in any of the downlink, the uplink, or both the downlink and the uplink.

6. The method of claim 1, further comprising identifying the candidate target network node as a relay station or a radio base station.

7. The method of claim 1, further comprising receiving a list of candidate target network nodes from the user equipment, which list is based on measurements of received signal strength, which list is made by the user equipment based on reference signals received by the user equipment from each respective candidate target network node.

8. The method of claim 6, wherein the candidate target network node is identified as a relay station, and wherein it is decided to send the handover request of the user equipment to said candidate target network node in the event that the acquired data-rate performance is lower than the data-rate performance threshold value.

9. The method of claim 7, wherein the candidate target network node is identified as a relay station, and wherein it is decided to not send any handover request to any relay candidate target network node in the event that the acquired data-rate performance exceeds the data-rate performance threshold value and all of the candidate target network nodes comprised in the received list of candidate target network nodes are identified as relay stations.

10. A radio base station, serving a user equipment, for deciding whether a handover request of the user equipment is to be sent to a candidate target network node, wherein the radio base station comprises:
a processing circuit configured to acquire data-rate performance of a wireless link between the radio base station and the user equipment, to compare the acquired data-rate performance with a data-rate performance threshold value, wherein the data-rate performance threshold value is based on previously determined throughput of a wireless link between at least one user equipment, via a relay node, and the radio base station or a neighboring radio base station, and to decide to send the handover request of the user equipment to the candidate target network node in the event that the acquired data-rate performance is lower than the data-rate performance threshold value.

11. The radio base station according to claim 10, wherein the data-rate performance threshold value is part of a set of data-rate performance threshold values, and wherein each data-rate performance threshold value is further associated with a level of load within a cell served by the radio base station, and wherein the processing circuit is further configured to obtain a level of load within the cell and to select the data-rate performance threshold value from the set of data-rate performance threshold values, which selected data-rate performance threshold value is further associated with the obtained level of load within the cell.

12. The radio base station according to claim 11, wherein each data-rate performance threshold value is further associated, in addition to the level of load within the cell served by the radio base station, also with an average level of load within the cell served by the radio base station and cells served by the candidate target network nodes, and wherein the processing circuit is further configured to select the data-rate performance threshold value from the set of data-rate performance threshold values, which selected data-rate performance threshold value is further associated with the average level of load within the cell served by the radio base station and the cells served by the candidate target network nodes.

13. The radio base station according to claim 10, wherein the processing circuit is further configured to acquire data-rate performance of the wireless link either by measuring the data-rate performance of the wireless link between the radio base station and the user equipment, or by receiving a measurement from the user equipment of the data-rate performance of the wireless link between the radio base station and the user equipment via a receiver comprised in the radio base station.

14. The radio base station according to claim 10, wherein the processing circuit is further configured to acquire data-rate performance of the wireless link between the radio base station and the user equipment by measuring transferred amount of data per time unit in any of the downlink, the uplink, or both the downlink and the uplink.

15. The radio base station according to claim 10, wherein the processing circuit is further configured to identify the candidate target network node as a relay station or a radio base station.

16. The radio base station according to claim 10, wherein the radio base station comprises a receiver configured to receive a list of candidate target network nodes from the user equipment, which list is based on measurements of received signal strength, which list is made by the user equipment based on reference signals received by the user equipment from each respective candidate target network node.

17. The radio base station according to claim 15, wherein the processing circuit is further configured to identify the candidate target network node as a relay station, and wherein the processing circuit is further configured to decide to send the handover request of the user equipment to said candidate target network node in the event that the acquired data-rate performance is lower than the data-rate performance threshold value.

18. The radio base station according to claim 10, wherein the processing circuit is further configured to identify the candidate target network node as a relay station, and wherein the processing circuit is further configured to decide to not send any handover request to any relay candidate target network node in the event that the acquired data-rate performance exceeds the data-rate performance threshold value and all of the candidate target network nodes comprised in the received list of candidate target network nodes are identified as relay stations.

19. A method in a relay station, serving a user equipment, for deciding whether a handover request of the user equipment is to be sent to a candidate target network node, the method comprising:
acquiring data-rate performance of a wireless link between the relay station and the user equipment;
comparing the acquired data-rate performance with a data-rate performance threshold value, wherein the data-rate performance threshold value is based on a previously determined throughput of a wireless link between at least one user equipment, via a relay node, and a donor radio base station or another radio base station; and deciding to send the handover request of the user equipment to the candidate target network node, if the acquired data-rate performance is lower than the data-rate performance threshold value.

20. The method of claim 19, wherein the data-rate performance threshold value is part of a set of data-rate performance threshold values, and wherein each data-rate performance threshold value is further associated with a level of load within a cell served by the relay station, the method further comprising:

obtaining a level of load within the cell; and selecting the data-rate performance threshold value from the set of data-rate performance threshold values, which selected data-rate performance threshold value is further associated with the obtained level of load within the cell.

21. The method of claim 20, wherein each data-rate performance threshold value is further associated, in addition to the level of load within the cell served by the relay station, also with an average level of load within the cell served by the relay station and cells served by the candidate target network nodes, and wherein the data-rate performance threshold value is selected from the set of data-rate performance threshold values, which selected data-rate performance threshold value is further associated with the average level of load within the cell served by the relay station and the cells served by the candidate target network nodes.

22. The method of claim 19, wherein acquiring data-rate performance of the wireless link comprises any of measuring the data-rate performance of the wireless link between the relay station and the user equipment, or receiving a measurement from the user equipment of the data-rate performance of the wireless link between the relay station and the user equipment.

23. The method of claim 19, wherein acquiring data-rate performance of the wireless link between the relay station and the user equipment comprises measuring transferred amount of data per time unit in any of the downlink, the uplink, or both the downlink and the uplink.

24. The method of claim 19, further comprising identifying the candidate target network node as a relay station or a radio base station.

25. The method of claim 19, further comprising receiving a list of candidate target network nodes from the user equipment, which list is based on measurements of received signal strength, which list is made by the user equipment based on reference signals received by the user equipment from each respective candidate target network node.

26. The method of claim 24, wherein the candidate target network node is identified as a radio base station, and wherein it is decided to send the handover request of the user equipment to said candidate target network node, disregarding any acquired data-rate performance.

27. The method of claim 24, wherein the candidate target network node is identified as a relay station, and wherein it is decided to send the handover request of the user equipment to said candidate target network node in the event that the acquired data-rate performance is lower than the data-rate performance threshold value.

28. The method of claim 25, wherein the candidate target network node is identified as a relay station, and wherein it is decided to not send any handover request to any relay candidate target network node in the event that the acquired data-rate performance exceeds the data-rate performance threshold value and all of the candidate target network nodes comprised in the received list of candidate target network nodes are identified as relay stations.

29. The method of claim 24, wherein none of the candidate target node is identified as a radio base station, the method further comprising:

requesting the user equipment to measure the strength of a reference signal received by the user equipment from further candidate target nodes and to report the result of the measurement to the relay station, and wherein it is decided to send the handover request of the user equipment to any of the further candidate target nodes, which is identified as a radio base station.

30. The method of claim 29, wherein requesting the user equipment to measure the strength of a reference signal received by the user equipment from further candidate target nodes and to report the result of the measurement to the relay station further comprises determining and transmitting a signal strength delta value to be received by the user equipment.

31. The method of claim 29, wherein the user equipment is requested to measure the strength of received reference signals from candidate target nodes in the event that the acquired data-rate performance exceeds an extra handover threshold value, which is set to a fraction of the maximum throughput of the relay station.

32. A relay station, serving a user equipment, for deciding whether a handover request of the user equipment is to be sent to a candidate target network node, wherein the relay station comprises:

a processing circuit configured to acquire data-rate performance of a wireless link between the relay station and the user equipment, to compare the acquired data-rate performance with a data-rate performance threshold value, wherein the data-rate performance threshold value is based on previously determined throughput of a wireless link between at least one user equipment, via a relay node, and a donor radio base station or another radio base station, and to decide to send the handover request of the user equipment to the candidate target network node in the event that the acquired data-rate performance is lower than the data-rate performance threshold value.

33. The relay station according to claim 32, wherein the data-rate performance threshold value is comprised in a set of data-rate performance threshold values, and wherein each data-rate performance threshold value is further associated with a level of load within a cell served by the relay station, and wherein the processing circuit is further configured to obtain a level of load within the cell and to select the data-rate performance threshold value from the set of data-rate performance threshold values, which selected data-rate performance threshold value is further associated with the obtained level of load within the cell.

34. The relay station according to claim 33, wherein each data-rate performance threshold value is further associated, in addition to the level of load within the cell served by the relay station, also with an average level of load within the cell served by the relay station and cells served by the candidate target network nodes, and wherein the processing circuit is further configured to select the data-rate performance threshold value from the set of data-rate performance threshold values, which selected data-rate performance threshold value is further associated with the average level of load within the cell served by the relay station and the cells served by the candidate target network nodes.

35. The relay station according to claim 32, wherein the processing circuit is further configured to acquire data-rate performance of the wireless link either by measuring the data-rate performance of the wireless link between the relay station and the user equipment, or by receiving a measurement from the user equipment of the data-rate performance of the wireless link between the relay station and the user equipment via a receiver comprised in the relay station.

36. The relay station according to claim 32, wherein the processing circuit is further configured to acquire data-rate performance of the wireless link between the relay station and the user equipment by measuring transferred amount of data per time unit in any of the downlink, the uplink, or both the downlink and the uplink.

37. The relay station according to claim 32, wherein the processing circuit, is further configured to identify the candidate target network node as a relay station or a radio base station.

38. The relay station according to claim 32, wherein the relay station comprises a receiver configured to receive a list of candidate target network nodes from the user equipment, which list is based on measurements of received signal strength, which list is made by the user equipment based on reference signals received by the user equipment from each respective candidate target network node.

39. The relay station according to claim 37, wherein the processing circuit is further configured to identify the candidate target network node as a radio base station and to decide to send the handover request of the user equipment to said candidate target network node, disregarding any acquired data-rate performance.

40. The relay station according to claim 37, wherein the processing circuit is further configured to identify the candidate target network node as a relay station and is further configured to decide to send the handover request of the user equipment to said candidate target network node in the event that the acquired data-rate performance is lower than the data-rate performance threshold value.

41. The relay station according to claim 32, wherein the processing circuit is further configured to identify the candidate target network node as a relay station, and is further configured to decide to not send any handover request to any relay candidate target network node in the event that the acquired data-rate performance exceeds the data-rate performance threshold value and all of the candidate target network nodes comprised in the received list of candidate target network nodes are identified as relay stations.

42. The relay station according to claim 32, wherein none of the candidate target node is identified as a radio base station and wherein the relay station comprises a transmitter configured to transmit a request to the user equipment to measure the strength of a reference signal received by the user equipment from further candidate target nodes and to report the result of the measurement to the relay station, and wherein the processing circuit is further configured to decide to send the handover request of the user equipment to any of the further candidate target nodes that is identified as a radio base station.

43. The relay station according to claim 42, wherein the processing circuit is further configured to determine and transmit a signal strength delta value, to be received by the user equipment.

44. The relay station according to claim 42, wherein the processing circuit is further configured to request the user equipment to measure the strength of received reference signals from candidate target nodes only in the event that the acquired data-rate performance exceeds an extra handover threshold value, which is set to a fraction of the maximum throughput of the relay station and associated with the triggering of an extra handover.

* * * * *